United States Patent
Koumura et al.

(10) Patent No.: US 6,512,971 B2
(45) Date of Patent: Jan. 28, 2003

(54) LOCK-UP CONTROL APPARATUS IN AUTOMATIC TRANSMISSION

(75) Inventors: Kazuo Koumura, Anjo (JP); Masao Saitou, Anjo (JP); Masayuki Kuwata, Anjo (JP); Muneo Kusafuka, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/838,579

(22) Filed: Apr. 20, 2001

(65) Prior Publication Data

US 2002/0038174 A1 Mar. 28, 2002

(30) Foreign Application Priority Data

Apr. 21, 2000 (JP) ......................................... 2000-121643

(51) Int. Cl.[7] ........................... G06G 7/70; B60K 41/02; F16H 61/14
(52) U.S. Cl. ............................ 701/51; 701/37; 477/65; 477/154
(58) Field of Search ................................ 701/37, 51, 67, 701/68; 477/65, 154, 169, 175, 64, 94, 168, 174, 180, 63, 181; 192/3.28, 3.31, 30 W; 475/65, 86, 150, 158; 123/333, 325

(56) References Cited

U.S. PATENT DOCUMENTS

| | | | | | |
|---|---|---|---|---|---|
| 3,871,249 | A | * | 3/1975 | Jeffers | 74/711 |
| 4,484,497 | A | * | 11/1984 | Hibino | 74/859 |
| 4,715,145 | A | * | 12/1987 | Takeda et al. | 74/731 |
| 4,881,627 | A | * | 11/1989 | Ishii | 190/76 |
| 4,899,279 | A | * | 2/1990 | Cote et al. | 364/424.05 |
| 5,651,752 | A | | 7/1997 | Wakahara et al. | 477/181 |
| 5,733,223 | A | * | 3/1998 | Matsubara et al. | 477/175 |
| 5,916,293 | A | * | 6/1999 | Katakura et al. | 701/67 |
| 6,022,294 | A | * | 2/2000 | Saito et al. | 477/169 |
| 6,264,581 | B1 | * | 7/2001 | Tashiro et al. | 477/154 |

* cited by examiner

*Primary Examiner*—Tan Nguyen
*Assistant Examiner*—Dalena Tran
(74) *Attorney, Agent, or Firm*—Lorusso & Loud

(57) ABSTRACT

In an automatic transmission having a torque converter interposed between an engine and a transmission mechanism, the torque converter includes a lock-up clutch capable of directly coupling an output shaft of the engine and an input shaft of the transmission mechanism. A speed difference detector is provided for detecting a difference between engine rotational speed and input shaft rotational speed. An engine speed controller means is also provided for controlling the engine speed to cause the speed difference to converge within a predetermined range. By detecting the speed difference, it is possible to precisely detect the actual vehicle state, and to reliably and smoothly engage the lock-up clutch without generating shift shock in any vehicle state. With this structure, the lock-up clutch can be reliably engaged and the engine brake can be secured.

22 Claims, 17 Drawing Sheets

|   | C1 | C2 | C3 | B1 | B2 | B3 | B4 | B5 | F1 | F2 |
|---|----|----|----|----|----|----|----|----|----|----|
| N |   |   |   |   |   |   |   | ○ |   |   |
| 1ST | ○ |   |   |   |   | (○) |   | ○ |   |   |
| 2ND | ○ |   |   | □ | ○ |   |   | ○ |   | ○ |
| 3RD | ○ |   | ○ | ○ | ○ |   |   |   | ○ |   |
| 4TH | ○ |   | ○ | ○ | ○ |   | ○ |   | ○ |   |
| 5TH | ○ | ○ |   |   | ○ |   |   |   | ○ |   |
| 3Low | ○ | ○ |   |   | ○ |   |   | ○ |   |   |
| 4Low | ○ | ○ |   |   | ○ |   | ○ |   |   |   |
| REV |   | ○ |   |   |   | ○ |   | ○ |   |   |

○ IS OPERATED WHEN ENGINE BRAKE IS APPLIED.

□ IS OPERATED IF NECESSARY.

FIG. 3

OUTLINE OF TORQUE INCREASE CONTROL

FROM FOURTH-SPEED LOCK-UP TO THIRD-SPEED LOCK-UP

FROM THIRD-SPEED TO THIRD-SPEED LOCK-UP

LOCK-UP CONTROL APPARATUS IN AUTOMATIC TRANSMISSION

BACKGROUND OF THE INVENTION

1. Field of the Invention

The invention relates to lock-up control apparatus in an automatic transmission of a vehicle having a torque converter between an engine and a transmission mechanism.

2. Description of Related Art

Japanese Patent Laid-Open Publication No. HEI 7-279700 discloses a control apparatus for an automatic transmission of an automobile with a torque converter between the engine and transmission, which control apparatus determines a coasting state, in which the engine is driven by the transmission, based on an index related to engine torque, and when the coasting state is detected, the engine speed is increased when the lock-up clutch is engaged. With this arrangement, it is possible to engage the lock-up clutch to secure the engine brake even in a low speed coasting state.

In the above-described control apparatus, as a method for detecting the coasting state, an accelerator OFF is judged by the index related to the engine torque, i.e., by a signal from a throttle sensor.

However, there is a problem, in terms of detection precision, in judging the coasting state using a signal from the throttle sensor or a signal from the accelerator as an index related to the engine torque, or a signal directly from the engine. Even if the coasting state is judged only when the accelerator opening is 0, in actual operation, the coasting state is established even when the accelerator opening is other than 0 in some cases.

For example, a coasting state may be established when a vehicle runs on a steep downhill, the accelerator pedal is slightly depressed and the vehicle speed is increasing. In such a case, although the vehicle is actually in a the coasting state in which the engine is driven by the transmission, since the accelerator pedal is depressed, the coasting state can not be detected, and the torque-up control can not be effected. Therefore, the lock-up clutch can not be reliably engaged, and the engine brake can not be applied in some cases.

SUMMARY OF THE INVENTION

Accordingly, it is an object of the present invention to provide a lock-up control apparatus in an automatic transmission capable of reliably engaging a lock-up clutch in any vehicle state, and capable of applying an engine brake.

According to a first aspect, the present invention provides a lock-up control apparatus in an automatic transmission having a torque converter between the engine and transmission, in which the torque converter includes a lock-up clutch capable of directly coupling an output shaft of the engine and an input shaft of the transmission. The lock-up control apparatus includes a lock-up clutch drive capable of engaging the lock-up clutch by hydraulic pressure in a state in which the engine speed is lower than the speed of the input shaft of the transmission mechanism. The lock-up control apparatus further includes speed difference detecting means for detecting a difference between the rotational speeds of the engine and the transmission input shaft; and engine speed control means for increasing the engine speed if the difference in rotational speeds detected by the speed difference detecting means exceeds a predetermined limit when the lock-up clutch is engaged.

Accordingly, if the rotational speed difference between the engine and the transmission input shaft detected by the speed difference detecting means exceeds the predetermined limit, when the lock-up clutch is engaged, the engine speed is increased to reduce the difference between the engine speed and the speed of the input shaft of the transmission. At that time, the speed difference detected by the speed difference detecting means can precisely indicate an actual coasting state of the vehicle. Thus, in any vehicle state, e.g., even when the throttle is slightly open on a steep downhill, it is possible to reliably engage the lock-up clutch, and to secure the engine brake. With such a control, the engine speed approaches the input shaft speed. In this manner, when the lock-up clutch is engaged, the speed difference between the engine and the transmission input shaft, to be absorbed by the lock-up clutch, is reduced. Therefore, even with the engaging hydraulic pressure of the lock-up clutch smoothly increased, the engagement can be completed within a short time, and the gear shift time can be shortened. The shift shock due to the difference in speeds between the engine and the input shaft of the transmission can also be prevented.

In a preferred embodiment, the engine speed control means includes engine control means for directly controlling the engine so that it becomes easy to control the engine speed. According to another preferred embodiment, the engine speed control means further increases output torque of the engine as the difference between the engine speed and the speed of the input shaft of the transmission becomes greater.

In the above-described preferred embodiment, it is possible to cause the actual speed difference to converge within a predetermined speed difference, irrespective of the magnitude of the speed difference. Further, if the speed difference is reduced, the engine torque can be set smaller and, thus, it is possible to prevent the engine speed from exceeding the input shaft speed, so as not to give the driver an unpleasant sensation. With such a control, when the lock-up clutch is released during gear shifting, even if the input shaft speed changes, the torque can be increased without time lag.

According to still another preferred embodiment, when the difference between the engine speed and the speed of the input shaft of the transmission remains unchanged, the engine speed control means reduces the engine output torque as the speed of the input shaft of the transmission mechanism increases. In this preferred form, it is possible to provide the desired control while taking the characteristics of the torque converter into consideration.

According to yet another preferred embodiment, when the difference between the engine speed and the speed of the input shaft of the transmission converges within a predetermined range, the engine speed control means maintains the output torque constant for a predetermined time (e.g., until the operation of engaging the lock-up clutch is completed). By maintaining the output torque constant, the engine speed can be maintained constant, and the operation of engaging the lock-up clutch can be smoothly effected.

According to yet another preferred embodiment of the invention, when the difference between the engine speed and the speed of the input shaft of the transmission converges within the predetermined range, if the output torque of the engine is positive, the engine speed control means maintains the output torque at 0. With this preferred form, when the output torque of the engine is positive, the engine drives the transmission mechanism. Therefore, by maintaining the output torque at 0, it is possible to prevent the engine speed from exceeding the input shaft speed, and to prevent the speed difference therebetween from increasing, whereby the lock-up clutch can be engaged smoothly.

According to another preferred embodiment, when the difference between the engine speed and the speed of the input shaft of the transmission mechanism converges within the predetermined range, if the output torque of the engine is negative, the engine speed control means maintains the output torque at that obtained when the difference converged within the predetermined range. In this preferred embodiment, when the output torque of the engine is negative, by maintaining the output torque at that obtained when the difference converged within the predetermined range, it is possible to maintain the difference between the engine speed and the input shaft speed within the predetermined range, and the lock-up clutch can be engaged smoothly.

According to still another preferred embodiment, when the lock-up clutch is engaged, the lock-up clutch drive sweeps up the engaging hydraulic pressure at a predetermined gradient to execute engagement. The sweep up is continued for a predetermined time after the difference between the engine speed and the speed of the input shaft of the transmission converges within the predetermined range and, then, the engagement of the lock-up clutch is maintained by a holding hydraulic pressure. With this preferred embodiment, after the difference between the engine speed and the speed of the input shaft of the transmission converges within the predetermined range, the sweep up is continued for a predetermined time so that the lock-up clutch can be engaged smoothly.

According to still another preferred embodiment, when the lock-up clutch is engaged, the lock-up clutch drive (driving means) sweeps up engagement hydraulic pressure at a predetermined gradient to execute the engaging operation and, at the instant when the difference between the engine speed and the input shaft speed converges within the predetermined range, the lock-up clutch drive immediately holds the engagement by application of a holding hydraulic pressure. With this preferred embodiment, the engaging operation of the lock-up clutch can be completed within a short time, thereby shortening the gear shift time.

According to yet another preferred embodiment, the engine speed control means maintains the output torque constant for a predetermined time after the engaging operation of the lock-up clutch, by the lock-up clutch driving means, is completed. With this preferred embodiment, the engine speed control means maintains the output torque constant for a predetermined time after the engaging operation of the lock-up clutch by the lock-up clutch driving means is completed. Therefore, the delay of the engaging operation of the lock-up clutch due to the response delay of the hydraulic pressure can be compensated, and the operation of engaging the lock-up clutch can be reliably completed.

According to a further preferred embodiment, the engine speed control means maintains the output torque constant for a predetermined time after the engaging operation of engaging the lock-up clutch by the lock-up clutch driving means is completed and, then, the engine speed control means sweeps down at a predetermined time. In this manner, it is possible to prevent the output torque of the engine from being abruptly changed, and to prevent a shift shock.

According to yet another preferred embodiment, when the output torque is increased, the output torque is limited within a range of a predetermined threshold value. Therefore, the engine speed is prevented from being abruptly changed, and the control is facilitated.

The difference between the engine speed and the speed of the input shaft of the transmission mechanism may be taken as a speed value whereby the difference between the engine speed and the speed of the input shaft of the transmission is easily obtained. Alternatively, the difference between the engine speed and the input shaft speed may be taken as a ratio ("speed ratio") between the engine speed and the input shaft speed.

According to still another preferred embodiment, when shifting from a first gear stage where the lock-up clutch is engaged to a second gear stage, the lock-up clutch driving means temporarily releases the lock-up clutch, and when the lock-up clutch is again engaged upon shifting to the second gear stage, the engine speed control means controls the engine speed so that the difference between the engine speed and the input shaft speed converges within the predetermined range. With this preferred embodiment, the engine brake is secured and the lock-up clutch is smoothly engaged without shift shock.

According to yet another preferred embodiment, when shifting from a first gear stage where the lock-up clutch is not engaged to a second gear shift stage, the engine speed control means controls the engine speed so that the difference between the engine speed and the input shaft speed converges within the predetermined range. In this manner the invention can be applied to secure the engine brake and to provide smooth engagement of the lock-up clutch without shift shock.

According to another preferred embodiment, when the lock-up is changed from its disengaged state at a given gear stage to its engaged state at the same gear stage, the engine speed control means controls the engine speed so that the difference between the engine speed and the input shaft speed converges within the predetermined range. In this manner also, the invention can be applied to secure the engine brake and to realize smooth engagement of the lock-up clutch without shift shock.

According to yet another preferred embodiment, the engine is provided with a fuel-cut device and the lock-up control apparatus further comprises fuel cut control means for discontinuing a fuel cut control carried out in the first gear shift stage in which the lock-up clutch is engaged, when the lock-up clutch is temporarily released by the lock-up clutch driving means. With this preferred embodiment, in the first gear stage, even if a fuel cut control has already been executed, it is possible to prevent the engine speed from being lowered abruptly when the lock-up clutch is released. Further, it is possible to swiftly bring the engine speed within the predetermined range by the engine speed control means, and the lock-up clutch can be engaged without a time lag. A fuel-cut device and control thereof are described, for example, in U.S. Pat. No. 5,651,752 entitled "Lock-Up Control System for Automatic Transmission", the teachings of which are incorporated herein by reference.

According to a further preferred embodiment, the engaging of the lock-up clutch by the lock-up clutch driving means is carried out simultaneously with the control of the engine speed by the engine speed control means. Therefore, the time lapsed from the instant of output of a command to start the operation of engaging the lock-up clutch to the instant when the operation of engaging the lock-up clutch is actually started, and a time required for converging the speed difference by the engine speed control means can be matched. Therefore, as compared with a case in which the lock-up clutch is engaged after the engine speed is controlled, the lock-up clutch can be more swiftly engaged without time lag.

According to another preferred embodiment, the lock-up control apparatus further comprises request torque calculating means for calculating engine torque requested by a driver by operation of an accelerator, and engine control releasing means for releasing the control of the engine by the engine control means when the engine torque calculated by the request torque calculating means exceeds output torque of the engine under control of the engine control means. In this preferred embodiment, upon engaging the lock-up clutch, when the coasting state is judged based on an index related to the engine torque, e.g., based on the throttle opening as an index, when the throttle opening becomes other than 0, the torque increase control is released. For example, when the vehicle is running on a steep downhill and its accelerator pedal is slightly depressed and the throttle opening thereby becomes other than 0, even if the actual vehicle state is in the coasting state although the accelerator pedal is depressed and the throttle opening becomes other than 0, the torque increase control is released. If the torque increase control is released, the output torque of the engine is set to a torque corresponding to the accelerator operation. But since the accelerator pedal is depressed only slightly, the output torque of the engine is smaller than the output torque by the torque increase control. Therefore, the lock-up clutch can not be engaged reliably in some cases. However, according to this invention, the engine control by the engine control means is released when the output torque requested by the driver by operation of the accelerator exceeds the output torque which is under torque increase control. Therefore, even if the control is released, the output torque is greater than the output torque which is under torque increase control, and the lock-up clutch can be reliably engaged.

In a second aspect of the invention, there is provided a lock-up control apparatus in an automatic transmission having a torque converter between an engine and a transmission mechanism, in which the torque converter includes a lock-up clutch capable of directly coupling an output shaft of the engine with an input shaft of the transmission mechanism. The lock-up control apparatus includes lock-up clutch driving means capable of engaging the lock-up clutch by hydraulic pressure in a state in which the engine speed is lower than the speed of the input shaft of the transmission mechanism. The lock-up control apparatus further includes speed difference detecting means for detecting a difference between the engine speed and the input shaft speed, and speed difference control means for reducing the speed difference if the speed difference detected by the speed difference detecting means exceeds a predetermined range when the lock-up clutch is engaged.

With the second aspect, if the speed difference between the engine speed and the input shaft speed detected by the speed difference detecting means exceeds the predetermined range, when the lock-up clutch is engaged, the speed difference control means, such as the control unit, the engine control system and the lock-up control program together provide control whereby the difference between the engine speed and the speed of the input shaft of the transmission mechanism is reduced. At that time, the speed difference detected by the speed difference detecting means can precisely detect the actual coasting state of the vehicle. Thus, in any of the states of the vehicle, e.g., even when the throttle is slightly depressed on a steep downhill, it is possible to reliably engage the lock-up clutch, and to secure the engine brake. With such a control, the engine speed approaches the input shaft speed. With this, when the lock-up clutch is engaged, the speed difference between the engine speed and the input shaft speed to be absorbed by engagement of the lock-up clutch is reduced. Therefore, even if the engaging hydraulic pressure of the lock-up clutch is smoothly increased, the engagement can be completed within a short time, and the gear shift time can be shortened. The shift shock caused due to the difference in speeds between the engine and the transmission input shaft can also be prevented.

BRIEF DESCRIPTION OF THE DRAWINGS

FIG. 3 is a table of operations of friction elements;

DETAILED DESCRIPTION OF PREFERRED EMBODIMENTS

Hereinafter, preferred embodiments of the invention will be explained with reference to the drawings.

Figure 2:
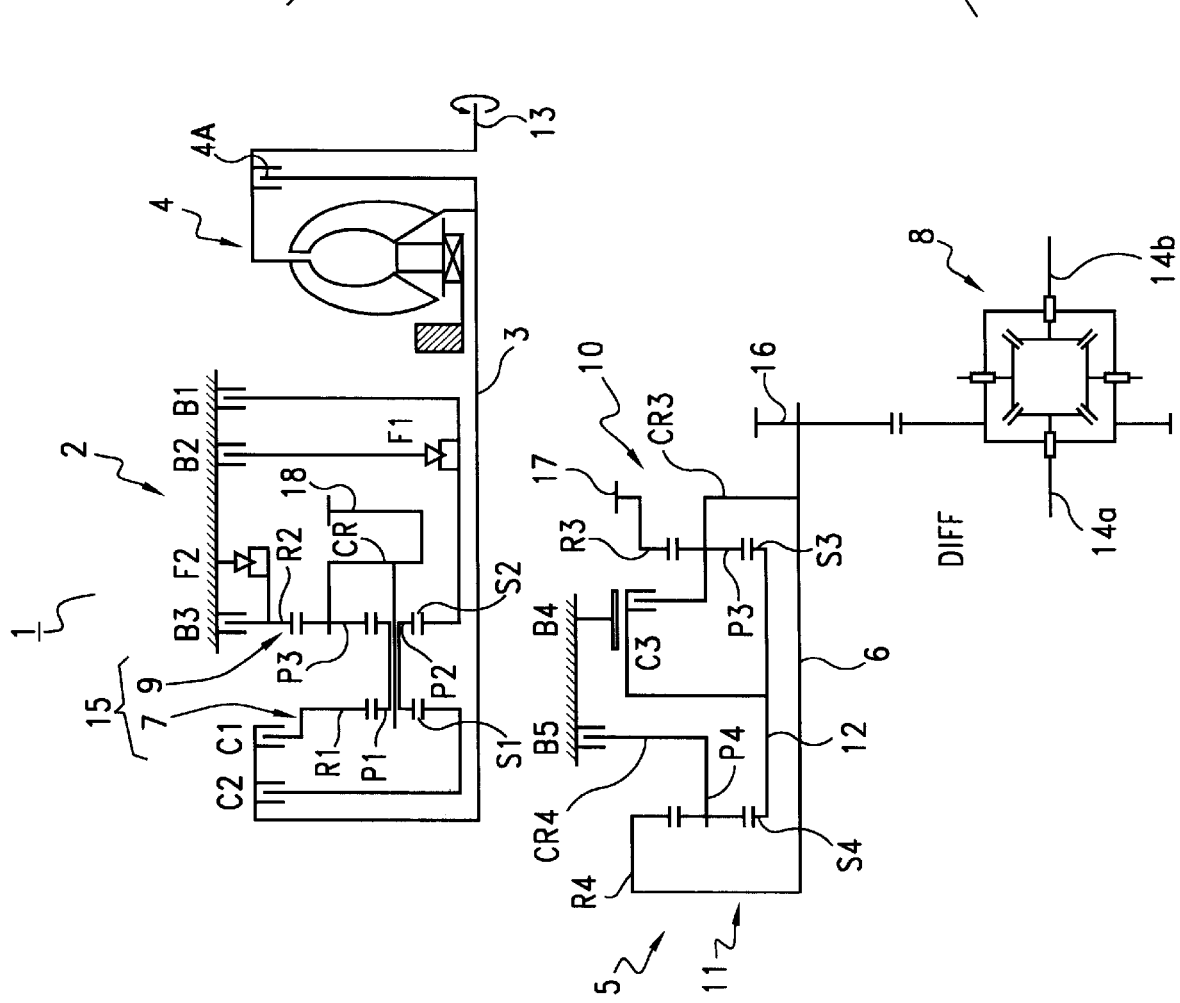
FIG. 2 is a skeletal diagram showing the mechanical portion of an automatic transmission to which this invention can be applied.

As shown in FIG. 2, a 5-speed automatic transmission 1 includes a torque converter 4, a 3-speed main transmission mechanism 2, a 3-speed auxiliary transmission mechanism 5, and a differential 8. These elements are connected to each other and accommodated in an integral case. The torque converter 4 includes a lock-up clutch 4a. The engine rotation is input from an engine crankshaft 13 to an input shaft 3 of the main transmission mechanism 2 through oil flow in the torque converter 4 or through a mechanical connection by the lock-up clutch 4a. The first shaft 3 (or, "input shaft"), a second shaft 6 (counter shaft) and third shaft (left and right axles) 14a and 14b are disposed in parallel with the crankshaft 13 and are rotatably supported in the integral case. A valve body is disposed outside the case.

The main transmission mechanism 2 includes a planetary gear unit 15 comprising a simple planetary gear unit 7 and a double pinion planetary gear unit 9. The simple planetary gear unit 7 comprises a sun gear S1, a ring gear R1 and a carrier CR supporting a pinion P1 meshed with the sun gear S1 and the ring gear R1. The double pinion planetary gear unit 9 comprises a sun gear S2 having a number of teeth different from that of the sun gear S1, a ring gear R2, and a common carrier CR supporting a pinion P2 meshed with the sun gear S2 and a pinion P3 meshed with the ring gear R2 together with the pinion P1 of the simple planetary gear unit 7.

The input shaft 3 which is connected to the engine crankshaft 13 through the torque converter 4 can be connected to the ring gear R1 of the simple planetary gear unit 7 through a first clutch (forward) C1, and to the sun gear S1 of the simple planetary gear 7 through a second (direct) clutch C2. The sun gear S2 of the double pinion planetary gear unit 9 can be locked directly to a first brake B1, and to a second brake B2 through a first one-way clutch F1. The ring gear R2 of the double pinion planetary gear unit 9 can be locked to a third brake B3 and a second one-way clutch F2. The common carrier CR is connected to a counter drive gear 18 which is an output member of the main transmission mechanism 2.

In the auxiliary transmission mechanism 5, an output gear 16, a first simple planetary gear unit 10 and a second simple planetary gear unit 11 are disposed in this order axially rearward of a counter shaft 6 constituting a second shaft. The counter shaft 6 is rotatably supported by the integral case through a bearing. The first and second simple planetary gear units 10 and 11 are of the Simpson type.

A ring gear R3 of the first simple planetary gear unit 10 is connected to a counter driven gear 17 meshing with the counter drive gear 18, and a sun gear S3 of the first simple planetary gear 10 is fixed to a sleeve shaft 12 which is rotatably supported by the counter shaft 6. The pinion P3 is supported by a carrier CR3 comprising a flange which is integrally connected to the counter shaft 6. The carrier CR3 supporting the other end of the pinion P3 is connected to an inner hub of a UD direct clutch C3. A sun gear S4 of the second simple planetary gear unit 11 is formed on the sleeve shaft 12 and connected to the sun gear S3 of the first simple planetary gear unit 10. A ring gear R4 of the second simple planetary gear unit 11 is connected to the counter shaft 6.

The UD direct clutch C3 is interposed between the carrier CR3 of the first simple planetary gear unit 10 and the connected sun gears S3, S4. The connected sun gears S3 and S4 can be locked to a fourth brake 134 comprising a band brake. A carrier CR4 supporting a pinion P4 of the second simple planetary gear unit 11 can be locked to a fifth brake B5.

Next, the operation of the mechanical portion of this 5-speed automatic transmission 1 will be explained with reference to FIGS. 2 and 3.

In a first-speed state in D (drive) range, a forward clutch C1 is engaged, the fifth brake B5 and the second one-way clutch F2 are locked, and the ring gear R2 of the double pinion planetary gear unit 9 and the carrier CR4 of the second simple planetary gear unit 11 are held in their stopped states. In this state, the rotation of the input shaft 3 is transmitted to the ring gear R1 of the simple planetary gear unit 7 through the forward clutch C1, and since the ring gear R2 of the double pinion planetary gear unit 9 is in its stopped state, both the sun gears S1 and S2 are idled in the direction opposite "normal" and the speed of rotation of common carrier CR in the "normal" direction is greatly reduced. That is, when the main transmission mechanism 2 is in first-speed, the reduced speed rotation is transmitted to the ring gear R3 of the first simple planetary gear unit in the auxiliary transmission mechanism 5 through the counter-gears 18 and 17. In the auxiliary transmission mechanism 5, the carrier CR4 of the second simple planetary gear unit is stopped in first-speed, and the reduced speed rotation of the main transmission mechanism 2 is further reduced by the auxiliary transmission mechanism 5 and is output from the output gear 16.

In second-speed, in addition to the forward clutch C1, the second brake B2 and the first brake B1 are operated, the engagement is switched from the second one-way clutch F2 to the first one-way clutch F1, and the fifth brake B5 is maintained in its locked state. In this state, the sun gear S2 is stopped by the second brake B2 and the first one-way clutch F1 and, thus, the revolution of the ring gear R1 of the simple planetary gear unit is transmitted from the input shaft 3 through the forward clutch C1 and rotates the carrier CR in the normal direction with reduced speed while idling the ring gear unit R2 of the double pinion planetary gear unit 9 in the normal direction. Further, the reduced speed rotation is transmitted to the auxiliary transmission mechanism 5 through the counter gears 18 and 17. That is, the main transmission mechanism 2 is brought into the second-speed state and the auxiliary transmission mechanism 5 is in the first-speed state due to engagement of the fifth brake B5. When the second-speed state and the first-speed state are combined, the second-speed is obtained as the output of the whole automatic transmission 1. At that time, the first brake B1 is also engaged.

In third-speed, the forward clutch C1, the second brake B2, the first one-way clutch F1 and the first brake B1 are held in their engaged states, and as the fifth brake B5 is released, the fourth brake B4 is engaged. That is, the state of the main transmission mechanism 2 is maintained as it is, and the rotation in the second-speed state is transmitted to the auxiliary transmission mechanism 5 through the counter-gears 18 and 17. In the auxiliary transmission mechanism 5, the rotation of the ring gear R3 of the first simple planetary gear unit is output from the carrier CR3 as second-speed rotation because the sun gear S3 and the sun gear S4 are fixed. Therefore, the third-speed is obtained as output of the entire automatic transmission 1 by the second-speed operation of the main transmission mechanism 2 combined with the second-speed operation of the auxiliary transmission mechanism 5.

In fourth-speed, the main transmission mechanism 2 is in the same state as in second speed and as in third-speed state in which the forward clutch C1, the second brake B2, the first one-way clutch F1 and the first brake B1 are engaged, and the auxiliary transmission mechanism 5 releases the fourth brake B4 and engages the UD direct clutch C3. In this state, the carrier CR3 of the first simple planetary gear unit is connected to the sun gears S3 and S4, and the planetary gear units 10 and 11 rotate integrally in a directly coupled manner. Therefore, the second speed of the main transmission mechanism 2 and the direct coupling (third-speed) of the auxiliary transmission mechanism 5 are combined, and the output of the entire automatic transmission 1 from the output gear 16 is in fourth speed.

In fifth-speed, the forward clutch C1 and the direct clutch C2 are engaged and the rotation of the input shaft 3 is transmitted to the ring gear R1 and the sun gear S1 of the simple planetary gear unit. In the main transmission mechanism 2, the gear unit integrally rotates in a directly coupled manner. At that time, the first brake B1 is released and the engaged state of the second brake B2 is maintained, but since the first one-way clutch F1 idles, the sun gear S2 idles. The auxiliary transmission mechanism 5 is in a directly coupled state where the UD direct clutch C3 is engaged and, thus, the third-speed (direct coupling) of the main transmission mechanism 2 and the third-speed (direct coupling) of the auxiliary transmission mechanism 5 are combined, and the output from the output gear 16 for the entire automatic transmission 1 is fifth speed.

This automatic transmission also has intermediate gear shift stages, i.e., third-speed low and fourth-speed low that are activated during down-shifting such as during acceleration.

In the third-speed low state, the forward clutch C1 and the direct clutch C2 are connected (the second brake B2 is in its engaged state but overruns by means of the one way clutch F1), and the main transmission mechanism 2 is in the third-speed state in which the planetary gear unit 15 is directly coupled. On the other hand, the fifth brake B5 is locked, the auxiliary transmission mechanism 5 is in the first-speed state and thus, the third-speed state of the main transmission mechanism 2 and the first-speed state of the auxiliary transmission mechanism 5 are combined, and a gear shift stage having a gear ratio between the second-speed and the third-speed is obtained as output of the entire automatic transmission 1.

In fourth-speed low, the forward clutch C1 and the direct clutch C2 are connected, and the main transmission mechanism 2 is in the third-speed state (directly coupled) as in third-speed low. On the other hand, in the auxiliary transmission mechanism 5, the fourth brake B4 is engaged, the sun gear S3 of the first simple planetary gear unit 10 and the sun gear S4 of the second simple planetary gear unit 11 are fixed and in the second-speed state. Therefore, the third-speed state of the main transmission mechanism 2 and the second-speed state of the auxiliary transmission mechanism 5 are combined, and a gear shift stage having a gear ratio between third-speed and fourth-speed can be obtained for the entire automatic transmission 1.

In FIG. 3, the dotted circular symbol indicates the operation of the engine brake at the time of coasting. That is, at the time of the first-speed, the third brake B3 is operated to prevent the ring gear R2 from rotating by the overrun of the second one-way clutch F2. In second-speed, third-speed and fourth-speed, the first brake B1 is operated to prevent the sun gear S1 from being rotated by the overrun of the first one-way clutch F1.

In reverse, the direct clutch C2 and the third brake B3 are engaged, and the fifth brake B5 is engaged. In this state, the rotation of the input shaft 3 is transmitted to the sun gear S1 through the direct clutch C2, and the ring gear R2 of the double pinion planetary gear unit is held stopped by means of the third brake B3. Therefore, the carrier CR rotates in reverse while idling the ring gear R1 of the simple planetary gear unit in the reverse direction, and this reverse rotation is transmitted to the auxiliary transmission mechanism 5 through the counter gears 18 and 17. In the auxiliary transmission mechanism 5, the carrier CR4 of the second simple planetary gear unit is also stopped when in reverse, and is held in the first-speed state. Therefore, the reverse rotation of the main transmission mechanism 2 and the first-speed of the auxiliary transmission mechanism 5 are combined, and the reverse and reduced speed rotation is output from the output gear 16.

Figure 1:
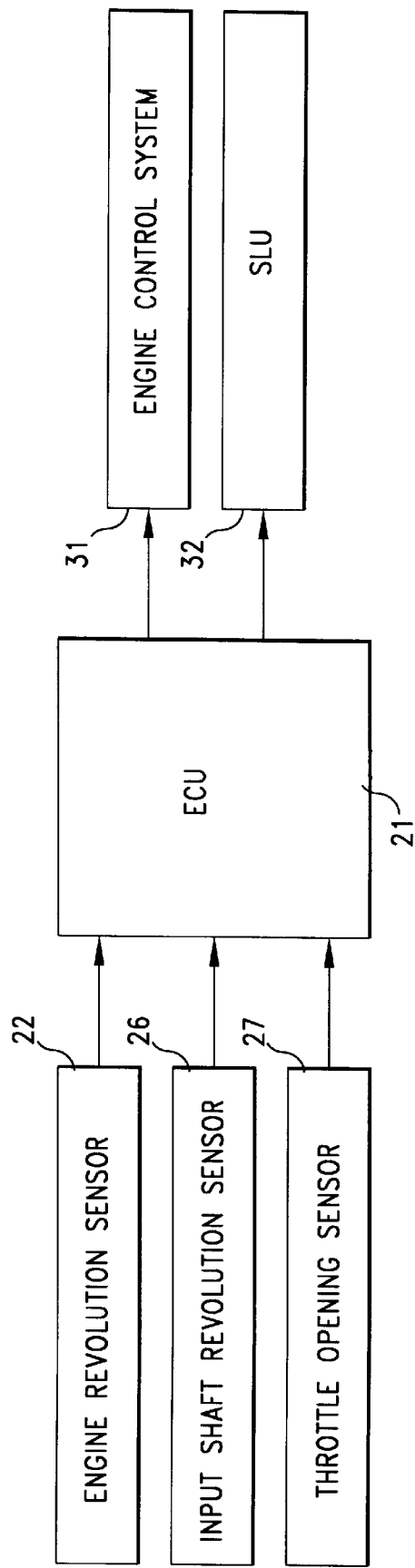
FIG. 1 is a block diagram of an electronic control unit according to the invention.

FIG. 1 is a block diagram showing the electric control system. An electronic control unit 21 (ECU) comprises a microcomputer. An engine speed sensor 22, an input shaft speed sensor 26 and a throttle opening sensor 27 are connected to the electronic control unit 21. A linear solenoid valve SLU32 and the like are also connected to the control unit 21 for driving and controlling the engine control system 31 and a hydraulic servo of the lock-up clutch (not shown).

Next, control when the gear stage is shifted from fourth-speed without lock-up to third-speed with lock-up will be explained with reference to FIG. 7. This gear shift may be either a gear shift operation in an automatic transmission operation mode based on a transmission map or a gear shift operation in a manual transmission mode based on manual shifting of a shift lever, a shift switch, or the like.

Figure 4:
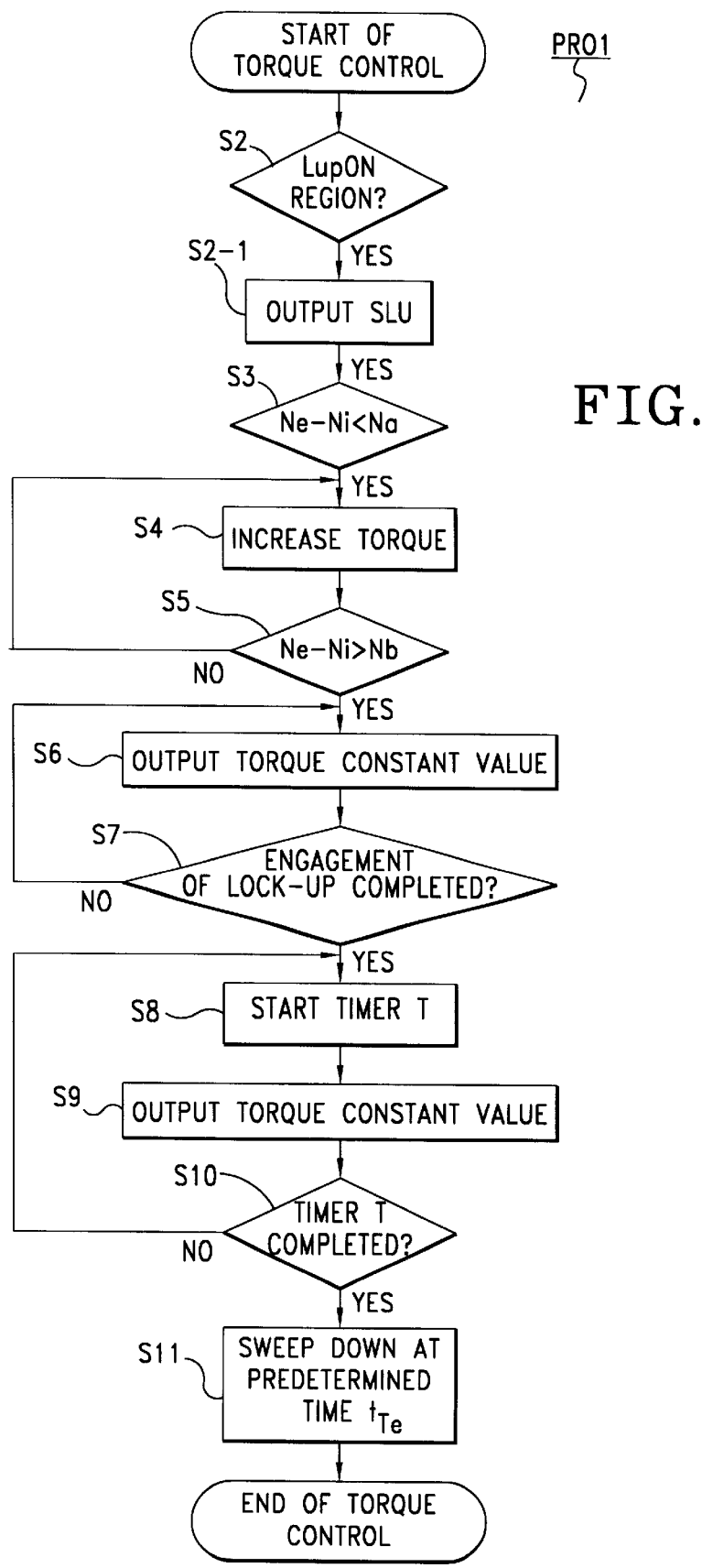
FIG. 4 is a flowchart of one example of a lock-up control program.

At a point in time T0, when the vehicle speed, i.e., the speed of the input shaft 3 of the transmission mechanism, is gradually lowered and the lock-up clutch is brought into a state of lock-up with the input shaft 3, and when the engine (E/G) speed Ne is also lowered, the control unit 21 executes the lock-up control program PRO1 shown in FIG. 4.

Figure 6:
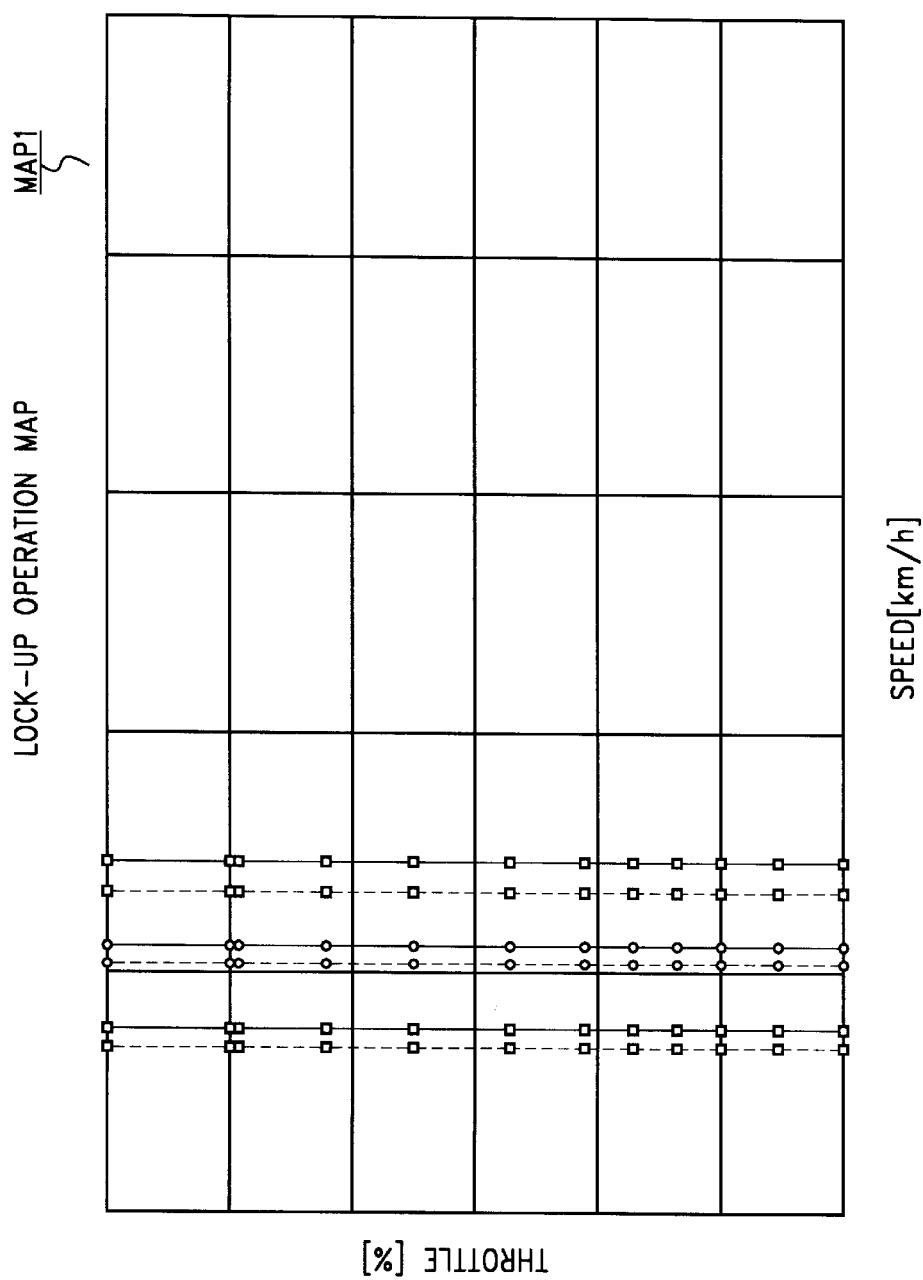
FIG. 6 is a lock-up operation map.

The control unit 21 judges whether the current running state is a state in which the lock-up should be ON, based on the vehicle speed obtained by the input shaft speed sensor 26 and the throttle opening obtained by the throttle opening sensor 27, and based on a lock-up operation map MAP1 stored in an appropriate memory in the control unit 21 shown in FIG. 6. In the lock-up operation map MAP1, the timing between the engagement (ON) and disengagement (OFF) of the lock-up clutch 4a in each gear stage is shown using the vehicle speed (SPEED) and throttle opening (THROTTLE) as parameters. The control unit 21 can promptly judge whether the vehicle is currently in a state in which the lock-up clutch 4a should be engaged by referring to the lock-up operation map MAP1. In FIG. 6, the right side of each solid line is a lock-up region for one of the gear stages, and the left side of a broken line is a lock-up release region for a gear stage.

Figure 7:
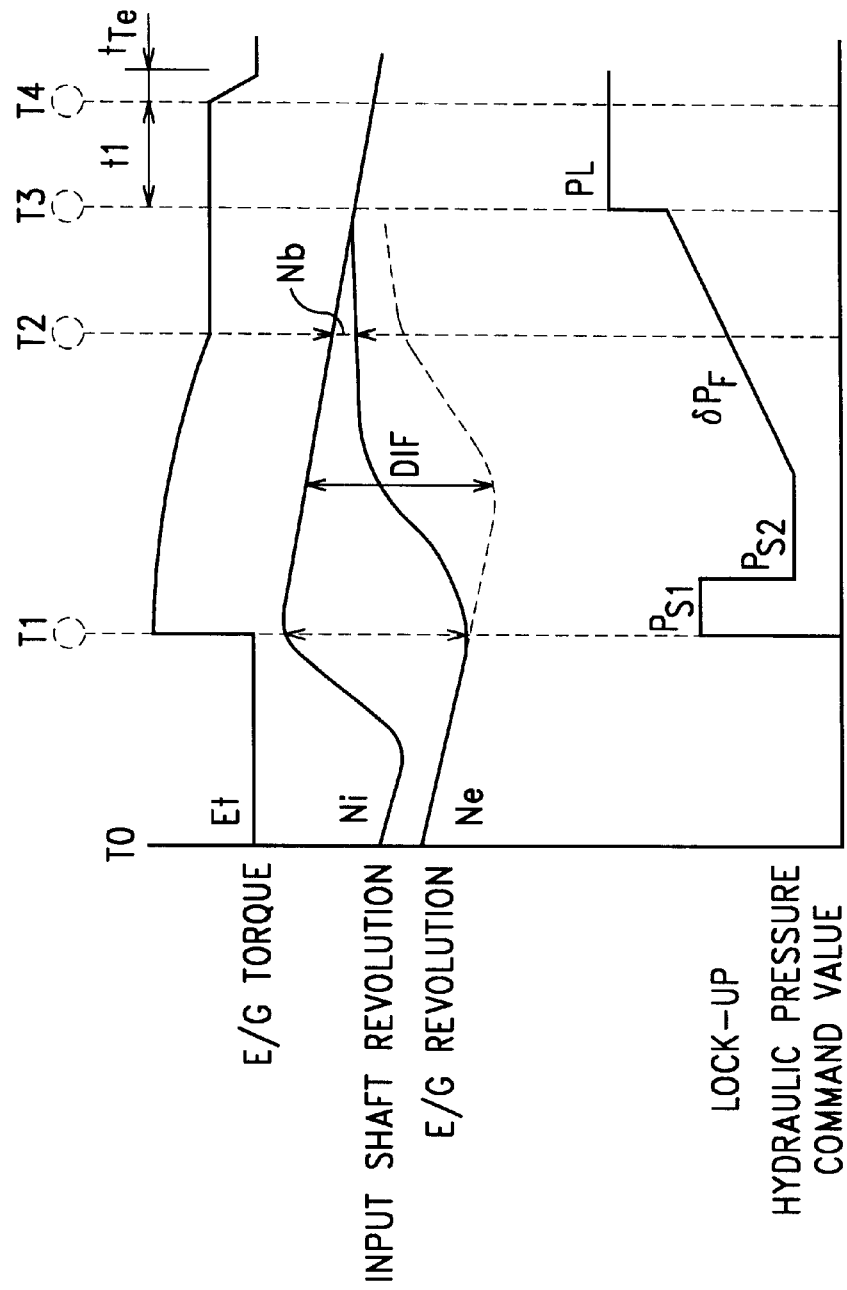
FIG. 7 is a time chart showing a relationship between engine output torque, input shaft speed, engine speed and the engaging of a lock-up clutch when a vehicle is shifted from fourth-speed without lock-up to third-speed with lock-up.

At a point in time T1 shown in FIG. 7, in step 2 of the lock-up control program PRO1, if it is judged that the vehicle has entered the region for the lock-up operation, the program enters step S2-1 where the linear solenoid valve SLU32 is driven to immediately drive the lock-up clutch to engage the lock-up clutch 4a of the torque converter 4. At the same time, the program enters step S3 where the control unit 21 judges whether the difference between the engine speed Ne and the input shaft speed Ni is smaller than a threshold value Na at which torque increase control is started. Usually, the Na is set to about −100 rpm, and if the difference between the engine speed Ne and the input shaft speed Ni is not equal to or lower than the threshold value Na, it is judged that the difference (Ne−Ni) is greater than the threshold value Na (usually a negative value) at which the torque increase control is started, and that not much difference exists between the two (i.e., engine control is unnecessary.) Thus, the engine is not controlled, and the ordinary control for engagement of the lock-up clutch 4a is carried out. In this case, as described above, since the difference between the engine speed Ne and the input shaft speed Ni is small, even if the lock-up clutch 4a is engaged, it does not give the driver an unpleasant sensation.

In step S3, if the difference between the engine speed Ne and the input shaft speed Ni is equal to or lower than the threshold value Na (in the case of FIG. 7, since the operation is accompanied by a down shift, the input shaft speed Ni is gradually increased from the time T0), the routine proceeds to step S4, the control unit 21 commands the engine control system 31 to increase the output torque Et of the engine, and upon receipt of this command, the engine control system 31 immediately starts execution of the control routine to increase the engine torque at time T1 as shown in FIG. 7. The output torque Et of the engine shown in FIG. 7 is a command value from the engine control system 31, and there is a slight time lag before the engine torque is actually increased.

Figure 14:
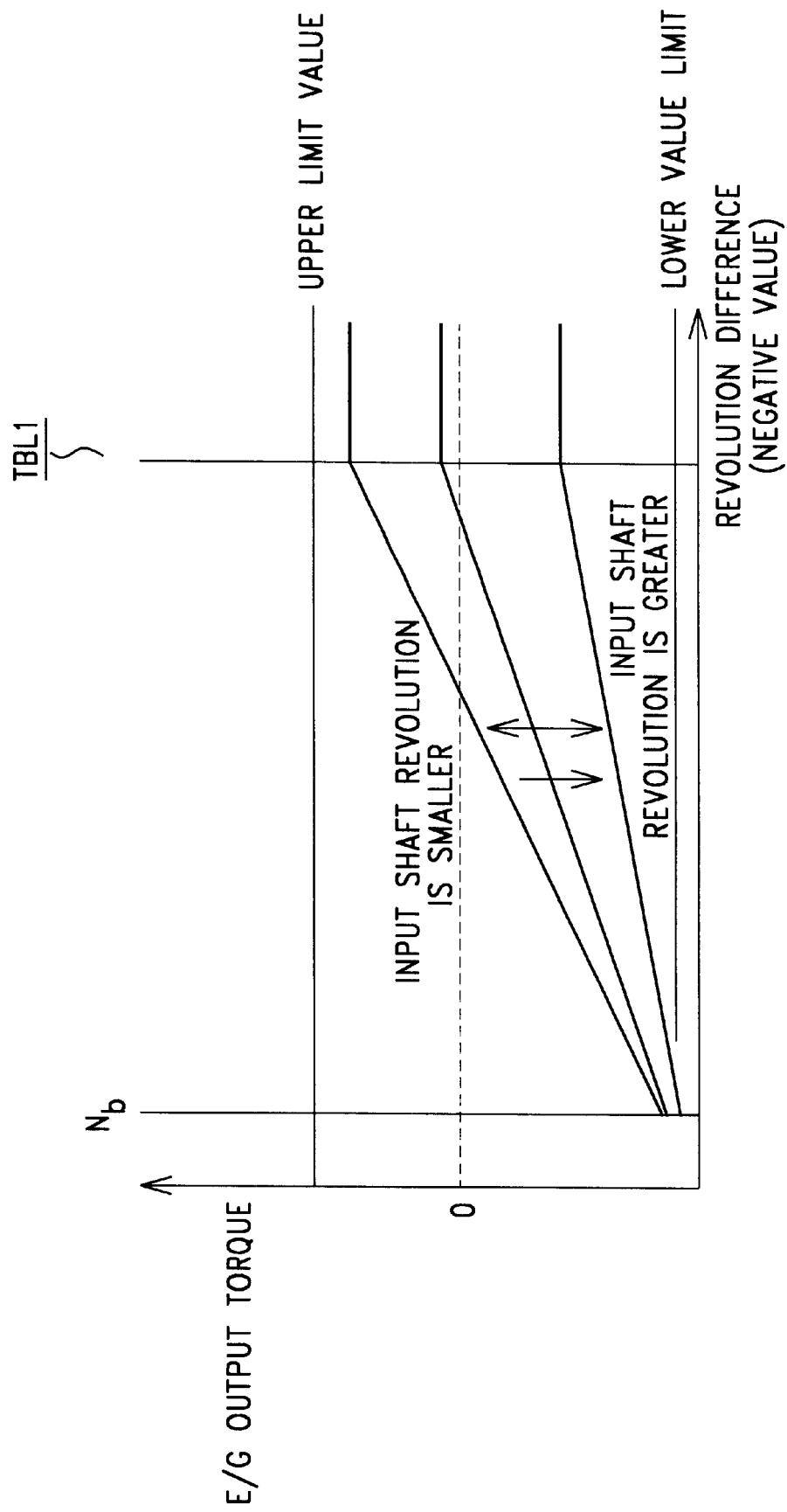
FIG. 14 is a diagram showing a relationship between engine output torque and the speed difference (engine speed—input shaft speed)

The control unit 21 determines a specific amount of increase of the output torque Et of the engine, i.e., a torque up amount based on a parameter table TBL1 of the speed difference—engine output torque shown in FIG. 14 which is stored in an appropriate memory. The parameter table TBL1 of the speed difference—engine output torque, is a map of the output torque Et of the engine relative to the speed difference (engine speed Ne–input shaft speed Ni) which is stored using the input shaft speed Ni (vehicle speed) as a parameter. If the speed difference and the input shaft speed Ni at that time are known, the output torque of the engine to be commanded is immediately determined by referring to the parameter table TBL1. The parameter table TBL1 is set such that if the speed difference is the same, as the input shaft speed Ni (vehicle speed) becomes smaller, the output torque of the engine becomes greater, and as the input shaft revolution Ni (vehicle speed) becomes greater, the output torque of the engine becomes smaller. This is greatly dependent on the torque converter characteristics. In order to avoid abrupt variation of the engine speed Ne, a predetermined upper limit value (positive value) and a lower limit value (negative value) are set for the output torque of the engine to be commanded.

Figure 10:
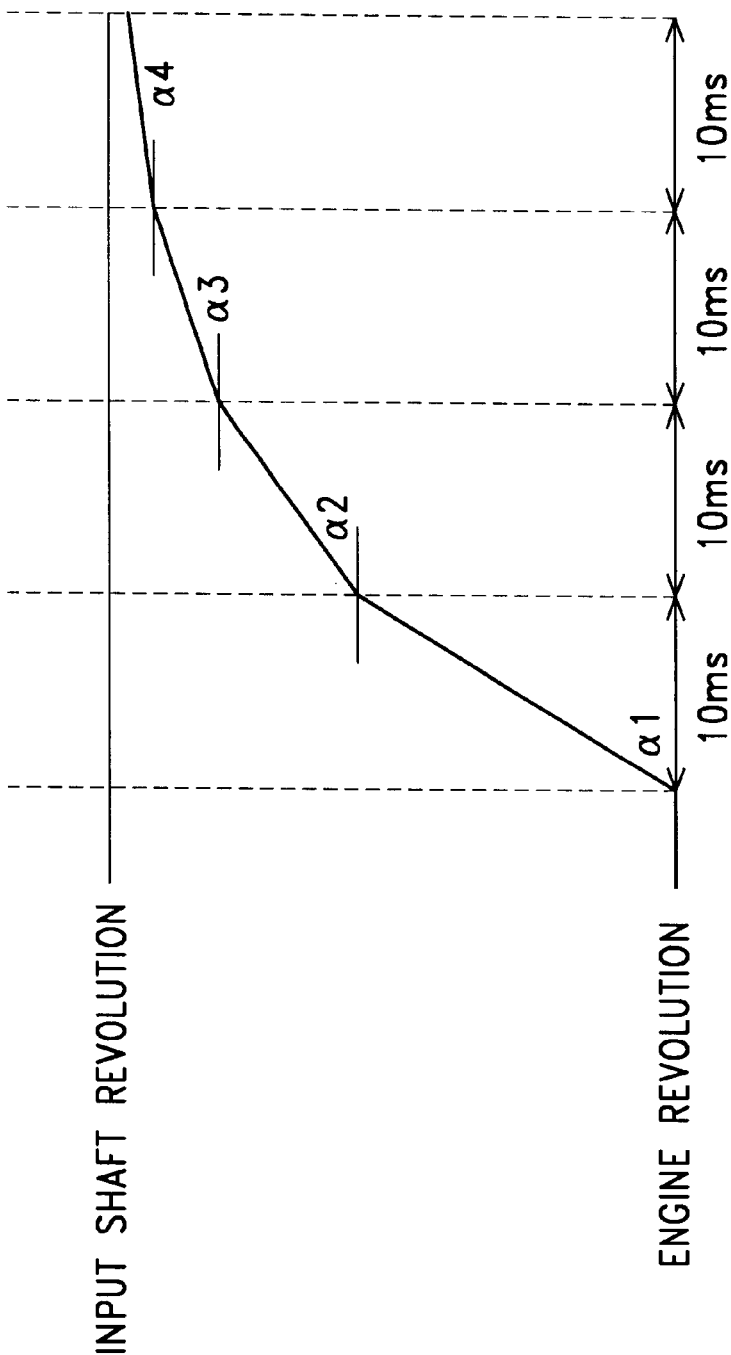
FIG. 10 is a time chart showing a general outline of torque increase control.

As shown in FIG. 10, the torque increase control of the engine in step S4 is executed every 10 ms (0.01 seconds). At that time, a target output torque of the engine is calculated from a map such as shown in FIG. 14, and the engine torque is controlled to the target torque. At the time of control, a plurality of increase rates (a1 to a5) for the engine speed are set and are sequentially applied such that the actual engine torque becomes equal to the calculated engine torque within a predetermined time (500 ms). Therefore, as the speed difference is increased, it is necessary that the engine torque become higher so the rate of increase for the initial engine speed is set steep, and the speed difference is converged within a predetermined speed difference within the predetermined time.

With this arrangement, irrespective of the speed difference, the speed difference can be brought within the predetermined speed difference quickly, and if the speed difference becomes small, the engine torque can be set to a smaller value to prevent the engine speed from exceeding the input shaft speed so as not to give an unpleasant sensation (shock). With such a control, even when the input shaft speed changes when the lock-up clutch is released during gear shifting, the torque increase control can be carried out without a time lag.

Figure 13:
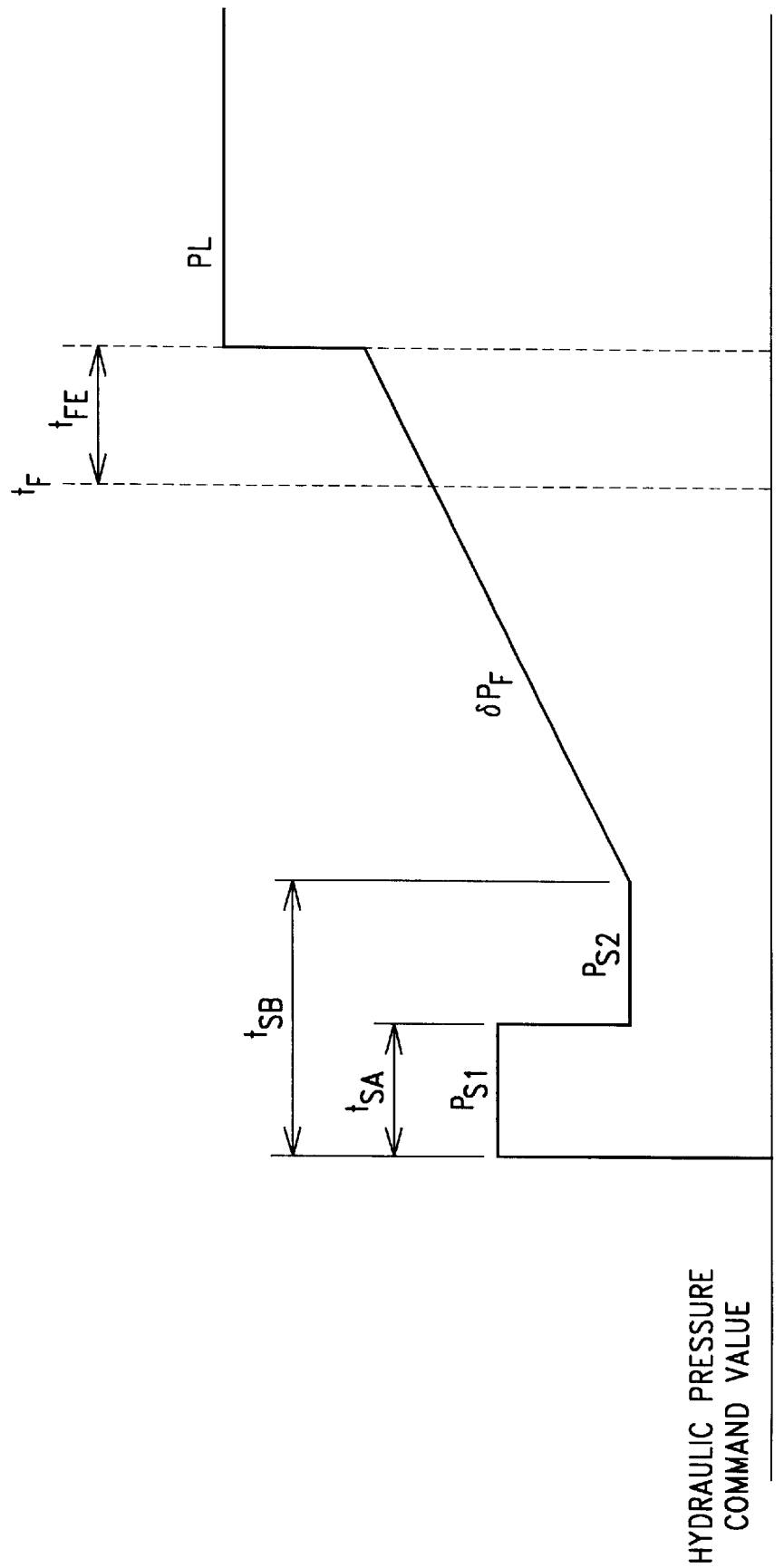
FIG. 13 is a time chart showing hydraulic pressure (command value) supplied to the lock-up clutch when the lock-up clutch is engaged.

As shown in FIG. 7, the output torque Et of the engine gradually increases and the engine speed Ne starts increasing in response thereto, and a difference between the engine speed Ne and the input shaft speed Ni is controlled to become smaller. At the same time, the control unit 21 starts engaging the lock-up clutch 4a through the SLU32. This engaging operation is carried out as shown in FIG. 13 based on a lock-up clutch engagement program PRO2 shown in FIG. 5. That is, at time T1, timing by a timer is started, i.e. step S21 in FIG. 5. In step S22, as shown in FIG. 13, hydraulic pressure Ps1 is supplied to a hydraulic servo of the lock-up clutch 4a for time $t_{SA}$ (step S23) so as to eliminate play (looseness). Thereafter, in step S24, the pressure is held at standby hydraulic pressure Ps2 until time $t_{SB}$ has elapsed (step S25). Further, as shown in FIG. 26, the pressure is swept up with a predetermined gradient $dP_F$, and the engagement proceeds.

On the other hand, as shown in FIG. 7, the speed difference between the engine speed Ne and the input shaft speed Ni, which is eliminated when the lock-up clutch 4a is engaged, is also reduced by the increase of the engine speed Ne caused by the controlled increase in the output torque Et of the engine. At time T2, which is it an intermediate state of the engagement of the lock-up clutch 4a, the speed difference reaches speed difference Nb (usually about –50 rpm) at which shift shock almost can not be recognized at all.

Then, when the control unit 21 judges in step S5 of the lock-up control program PRO1 that the speed difference between the engine speed Ne and the input shaft speed Ni has reached the threshold value Nb at which the predetermined torque increase control should be completed, the procedure proceeds to step S6 at time T2. The control unit 21 commands the engine control system 31 to maintain the engine output torque constant. The engine control system 31 controls the engine such that the engine output torque becomes constant, and the engine speed Ne is held at that value at time T2.

At that time, when the engine output torque is positive, i.e., when the torque of the engine drives the transmission, the engine output torque is held at 0, the engine is controlled so that the engine speed Ne does not exceed the input shaft speed Ni and so that a state in which the engine speed Ne and the input shaft speed Ni are equal is maintained. When the engine output torque is negative, i.e., when the transmission drives the engine, the engine output torque when the speed difference reached Nb in step S5 is determined as constant holding torque in step S6, this output torque Et is held, and the engine revolution Ne at that time is maintained.

Figure 5:
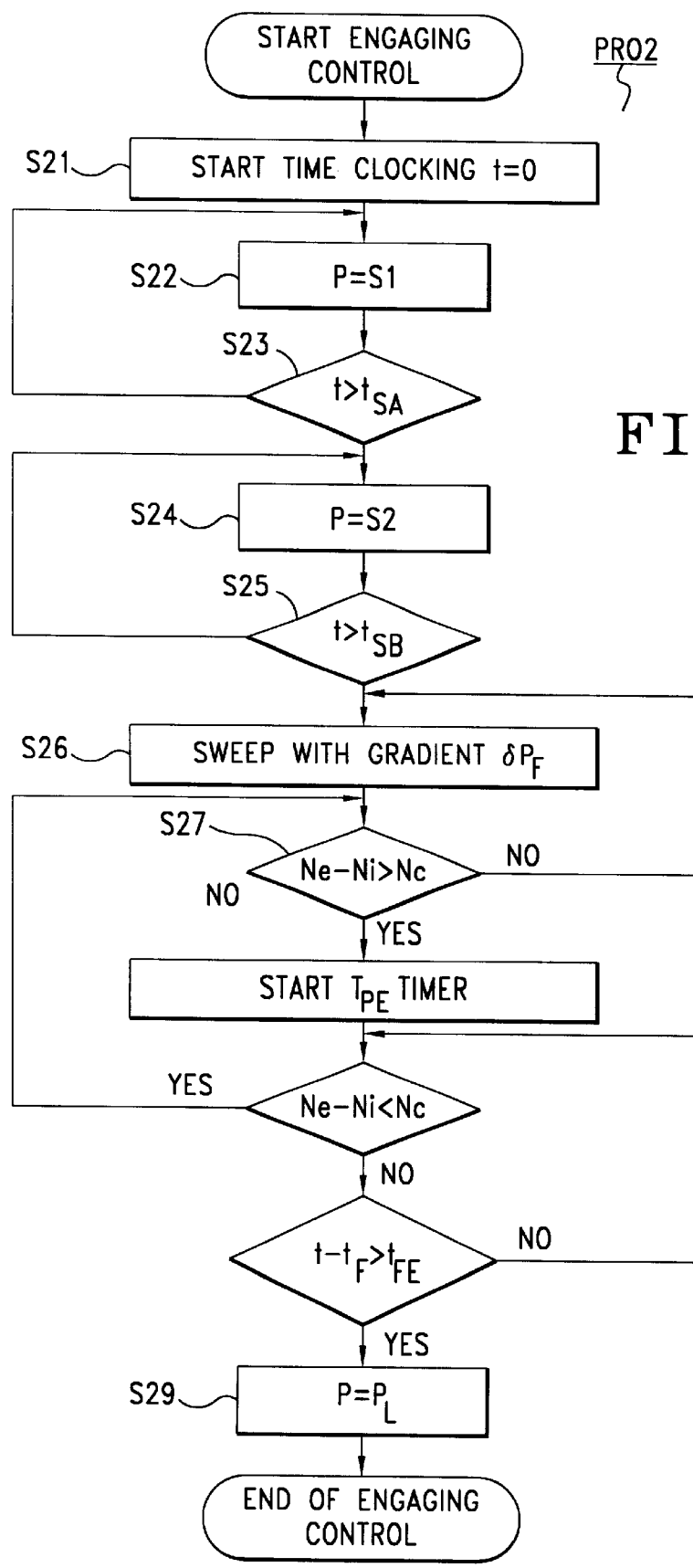
FIG. 5 is a flowchart of one example of a lock-up clutch engaging program.

During this time also, the engaging pressure of lock-up clutch 4a is swept up with the predetermined gradient $dP_F$, i.e., in step S26 of the lock-up clutch engagement program PRO2 as shown in FIGS. 5, 7 and 13, and the timer is started in step S26-1. If the speed difference (Ne–Ni) is reduced to a predetermined value (usually, –30 rpm) in step S27 (when the condition in step S27 is not established), the routine proceeds to step S28 where the sweep up is continued for a predetermined time $t_{FE}$ to continue the operation of engaging the lock-up clutch 4a while smoothly eliminating the speed difference. Accordingly, while there exists a speed difference, the process of engaging the lock-up clutch 4a gradually proceeds by sweep-up of the hydraulic pressure and, thus, the speed difference is smoothly eliminated and shift shock is prevented. Next, the routine proceeds to step S29 where the lock-up clutch 4a is completely engaged and held with the holding hydraulic pressure PL. In this manner, the engagement proceeds without generating shift shock and the engaging operation is completed at the time T3. As shown in FIG. 7, the input shaft 3 and the engine are directly coupled through the lock-up clutch 4a, the input shaft speed Ni and the engine speed Ne become the same at time T3 and, thereafter, the lock-up clutch 4a is held at the holding hydraulic pressure PL.

In step S7 of the lock-up control program PRO1, the control unit 21 actuates the timer in step S8 when the control unit 21 judges that the engaging operation of the lock-up clutch 4a is complete at time T3, and continues the control to maintain the output torque Et of the engine constant for a predetermined time , i.e., from t1 to the time T4, in step S9 up to step S10. In this manner, as shown in FIGS. 7 and 13, a response lag is generated in the actual hydraulic pressure supply relative to the lock-up hydraulic pressure command (current value) to the SLU32, the output torque Et of the engine is held so that the delay in the engagement of the lock-up clutch 4a is taken into consideration, and the engagement of the lock-up clutch 4a is reliably completed before the time T4.

In step S10, when the time is judged lapsed by the timer, the routine proceeds to step S11, the control unit 21 controls the engine control system 31 such that the constant control of the engine output torque is stopped and the engine output torque Et is swept down at a predetermined time $t_{Te}$, and the control based on the lock-up control program PRO1 is completed.

The engine speed Ne increase after time T1, without control of the engine output torque Et, is shown as the dotted line in FIG. 7. As apparent from FIG. 7, without control of the engine torque, a larger speed difference DIF is generated, and in this state, if the lock-up clutch 4a is engaged, a large shift shock is generated.

Figure 8:
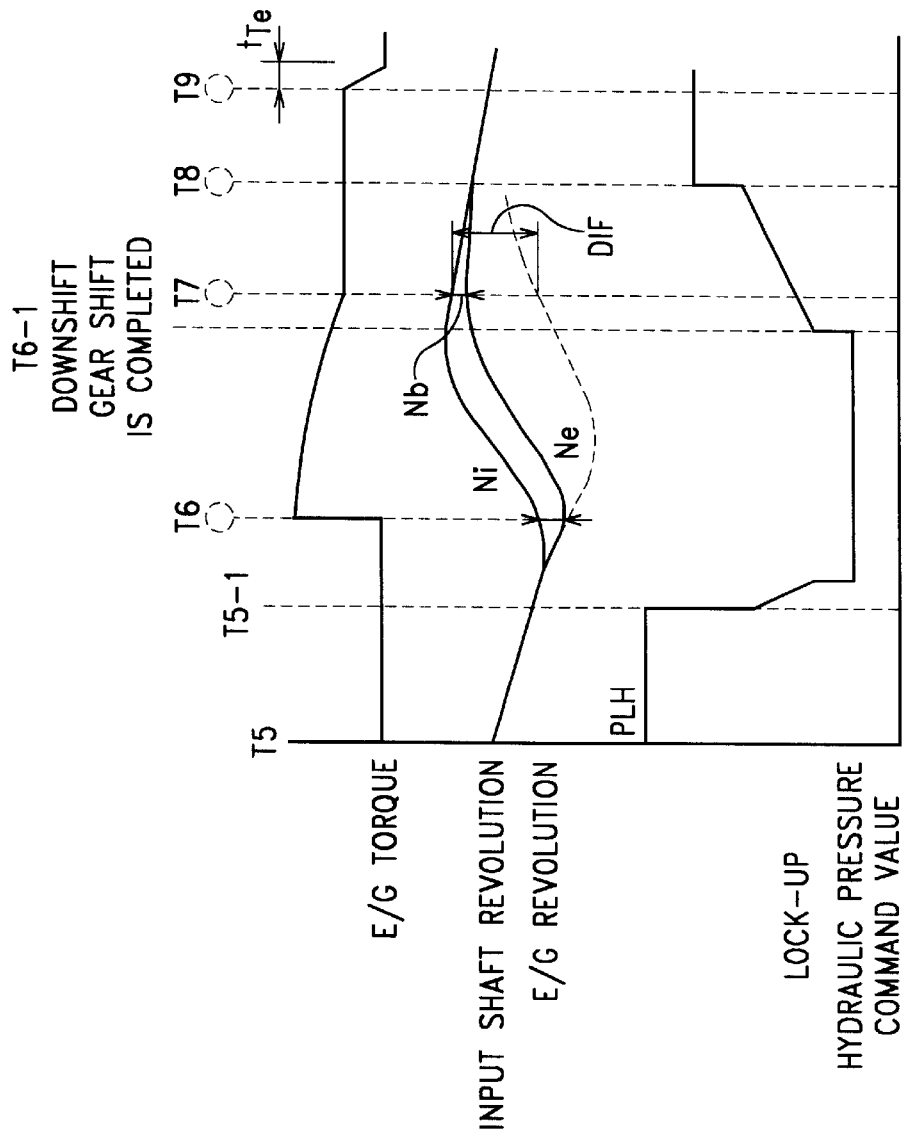
FIG. 8 is a time chart showing the relationship between the engine output torque, the input shaft speed, the engine speed and the engaging of the lock-up clutch when the vehicle is shifted from a fourth-speed with lock-up to a third-speed with lock-up.

FIG. 8 shows a control in the coasting state which results from a shift down from the fourth-speed lock-up state to the third-speed lock-up state. This control is basically the same as that shown in FIG. 7, in that the lock-up clutch 4a and the engine are controlled based on the lock-up control program PRO1 and the lock-up clutch engagement program PRO2. Hereinafter, only that portion of the control routine different from that shown in FIG. 7 will be explained, i.e., explanation of the identical portions will be omitted.

From the time pT5 the vehicle speed is gradually decreased to reach the coasting state, at which time the input shaft 3 and the engine are in the lock-up state, and the hydraulic pressure command for the lock-up clutch 4a is a high value PLH. Thus, the engine speed Ne and the input shaft speed Ni become equal. However, if the shift down to a third-speed lock-up state is detected in step S2 of the lock-up control program PROI based on the lock-up operation map MAP shown in FIG. 6, at the time T5-1, the control unit 21 commands the SLU32 to temporarily release the lock-up to prevent shift shock in preparation for the down-shift. With this command, the hydraulic pressure of the lock-up clutch 4a is released.

Then, as in FIG. 7, the engine speed Ne starts lowering gradually relative to the input shaft speed Ni, and at time T6, the speed difference (Ne−Ni=Na) between the engine speed Ne and the input shaft speed Ni becomes lower than the predetermined value, and the engine output torque Et is increased. The down-shift from fourth-speed to third-speed is effected, and the input shaft speed Ni is increased. The engine speed Ne is increased by the increase control of the engine output torque, and at time T7, if the speed difference Na exceeds a predetermined value (Ne−Ni=Nb), the engine speed Ne is held constant until a time T8. During time T8 to T9, the engine output torque Et is held constant and the lock-up clutch 4a is reliably engaged.

The increase in engine speed Ne without control of the engine output torque Et beginning at time T6 is shown as a dotted line in FIG. 8. As apparent from FIG. 8, when the lock-up clutch 4a is engaged, a great speed difference DIF is generated, and in this state, if the lock-up clutch 4a is engaged, a shift shock is generated.

Figure 15:
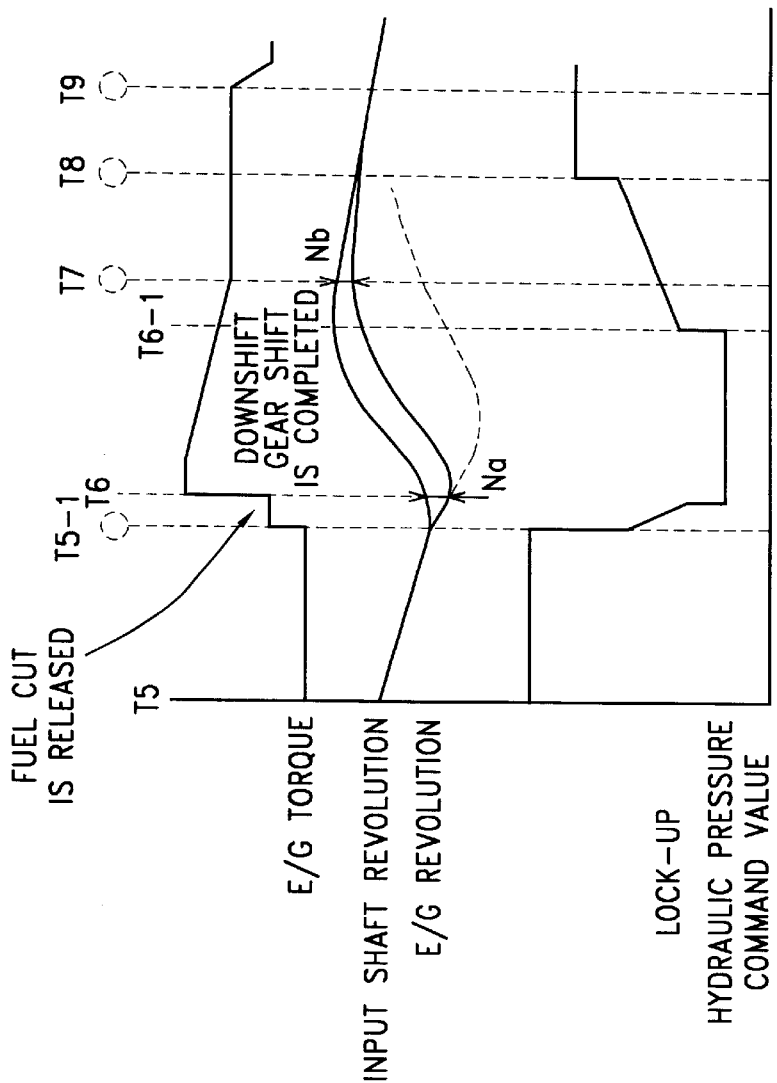
FIG. 15 is a time chart showing the relationship between the engine output torque, the input shaft speed, the engine speed and the engaging of the lock-up clutch when the vehicle state is shifted from fourth-speed with lock-up to the third-speed without lock-up in another embodiment.

In the fourth-speed lock-up state shown in FIG. 8, if fuel cut control of the engine is executed to enhance fuel consumption, the engine speed is abruptly lowered at time T5 after the lock-up is released at time T5-1. At the time of subsequent torque increase control, the time required to converge the speed difference within a predetermined range may be prolonged in some cases. Thus, at the time point T5-1 at which the gear shift was judged, as shown in FIG. 15, the fuel cut control is discontinued and the engine torque is immediately increased by a predetermined value, thereby preventing the engine speed from abruptly decreasing. With this arrangement, it is possible to increase the torque in steps S4 and S5 without time lag, and to maintain the engine torque constant after step S6.

As shown in FIGS. 8 and 15, the engaging of the lock-up clutch is immediately started by the linear solenoid valve SLU32 at the time T6-1 at which the down-shift to the third-speed is completed. At the time T6-1, although the speed difference is not a value equal to or greater than the predetermined value Nb in step S5, since the lock-up hydraulic pressure command value (current value) to the SLU32 is increased and the hydraulic pressure to be supplied to the lock-up clutch is actually increased, the speed difference is converted to the predetermined value Nb before the lock-up clutch starts engaging and, thus, it is possible to engage the lock-up clutch without delay.

Figure 9:
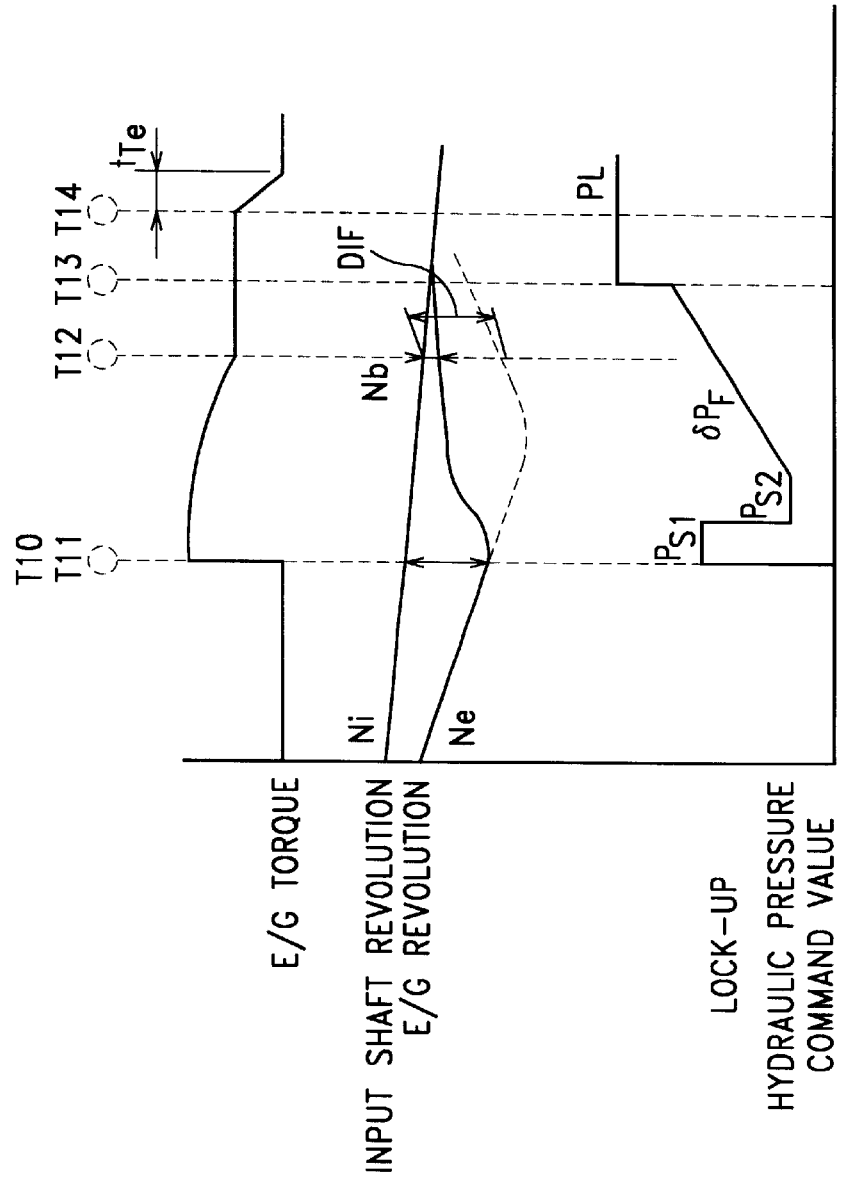
FIG. 9 is a time chart showing the relationship between the engine output torque, the input shaft speed, the engine speed and the engaging of the lock-up clutch when the vehicle is shifted from a third-speed without lock-up to the third-speed with lock-up.

FIG. 9 shows control in a shift from the third-speed without lock-up state to the third-speed lock-up state.

Basically, this control is the same as those shown in FIGS. 7 and 8, except prior to time T10 which is without lock-up. Thus, the difference between the engine speed Ne and the input shaft speed Ni is being increased. At time T10, when lock-up is indicated by the lock-up operation map MAP1, hydraulic pressure is supplied to the lock-up clutch 4a, and the hydraulic pressure command value is shifted from Ps1 to the standby pressure Ps2. Next, at a time point T11 (or simultaneously at time T10), the engine output torque is increased and, accordingly, the engine speed Ne is increased. The hydraulic pressure of the lock-up clutch 4a is swept up, and the operation for engaging the lock-up clutch 4a is started. At time T12, the speed difference Nb exceeds the predetermined speed, the difference between the engine speed Ne and the input shaft speed Ni is reduced to such a degree that shift shock is not generated when the lock-up clutch 4a engages. Thereafter, the engine output torque Et is maintained constant up to time T13 at which time the operation of engaging the lock-up clutch 4a is completed. This state is maintained up to time T14, and the lock-up clutch 4a is reliably engaged.

Figure 11:
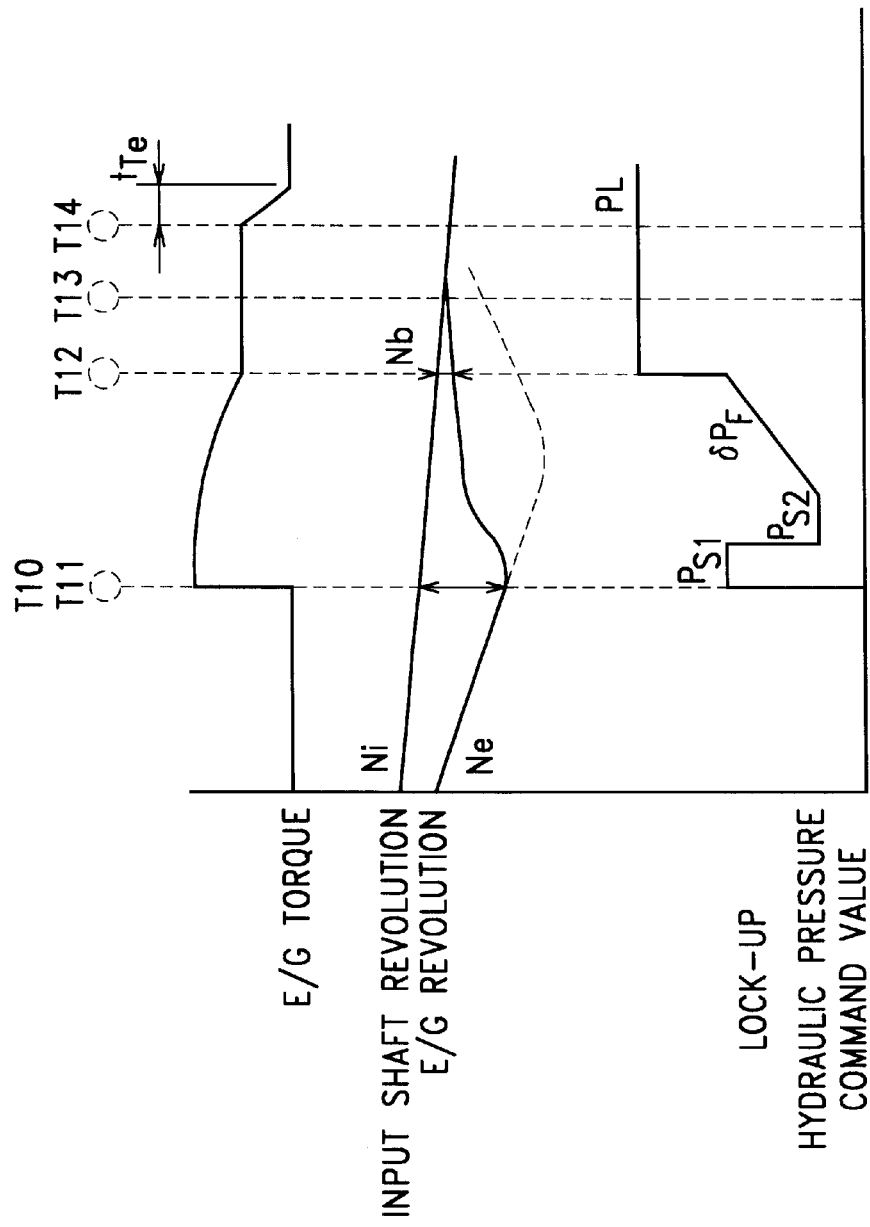
FIG. 11 is a time chart showing another mode of control for engaging the lock-up clutch.

At the time T12, as described above, since the difference between the engine speed Ne and the input shaft speed Ni is reduced to such a degree that shift shock is not generated when the lock-up clutch 4a engages, the hydraulic pressure of the lock-up clutch 4a may be increased to the holding pressure PL all at once at time T12 as shown in FIG. 11, to complete the lock-up operation within a short time. This operation can be applied not only to the lock-up operation for transition from the third-speed without lock-up state to the third-speed lock-up state shown in FIG. 9, but also to any lock-up operation, and to the stages at the times T2 and T7 shown in FIGS. 7 and 8.

The engine speed Ne, when control of the engine output torque Et is not initiated at the time T6, is shown as a dotted line in FIG. 9. As apparent from FIG. 9, when a large speed difference DIF exists, if the lock-up clutch 4a is engaged, a large shift shock is generated.

Figure 16:
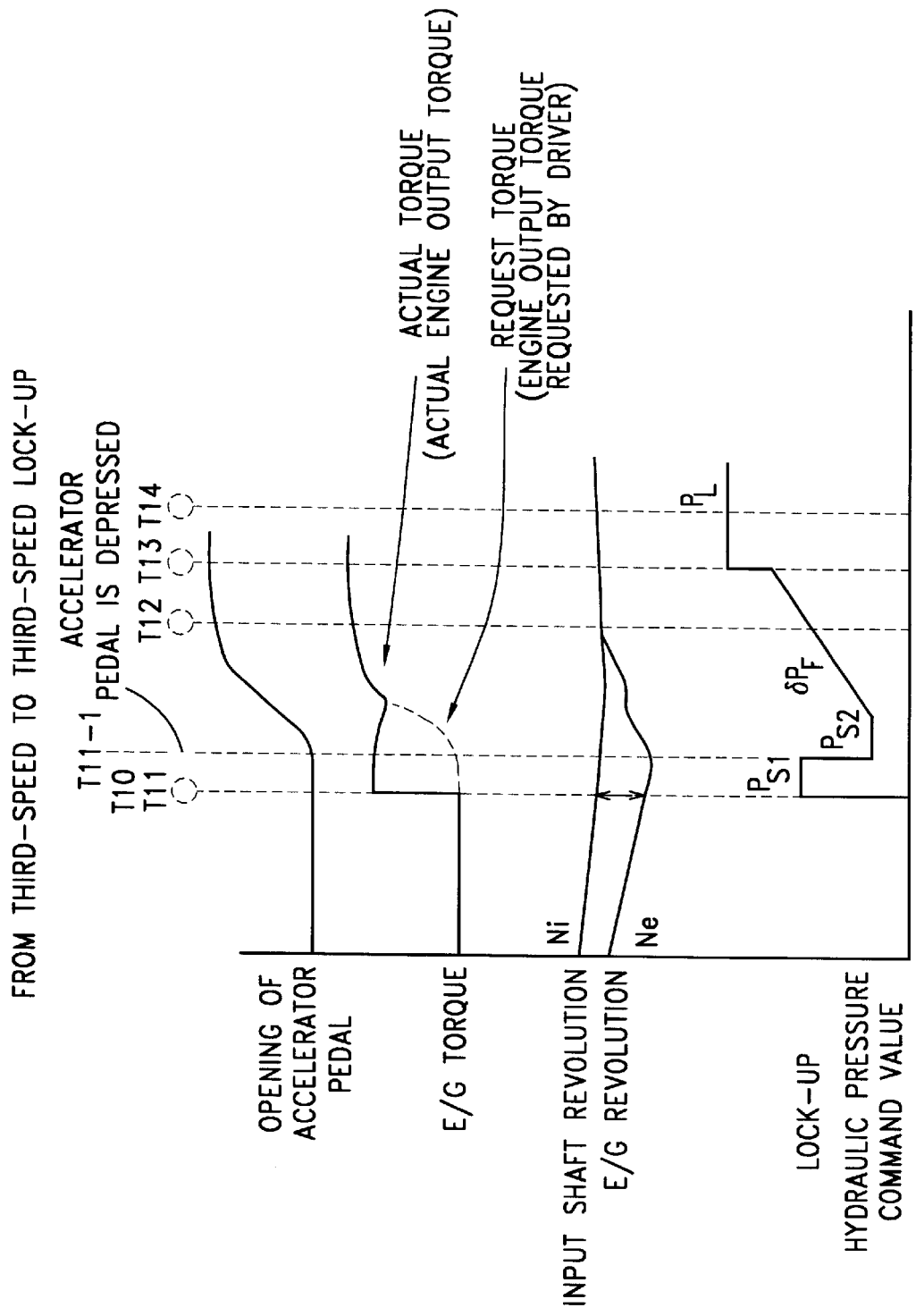
FIG. 16 is a time chart showing a control mode in the case where a driver operates the accelerator pedal while the vehicle is shifting from the third-speed without lock up state to the third-speed with lock-up.
Figure 17:
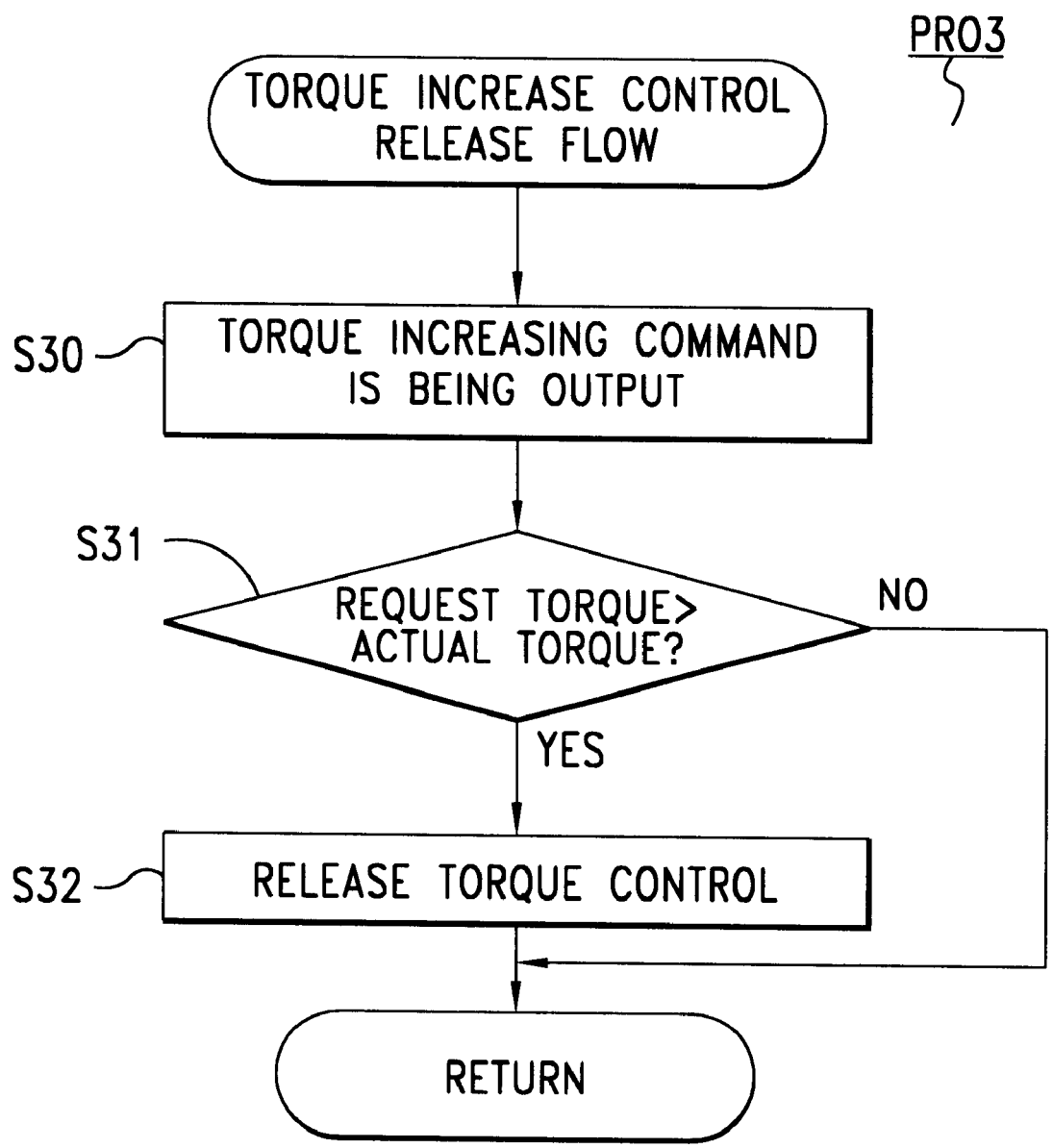
FIG. 17 is a flowchart showing one example of a torque control cancel judging program.

Further, as shown in FIG. 16, when the control of the increase in engine torque was started and if a driver depressed the accelerator pedal at time T11 in a state where the speed difference has not yet reached the predetermined speed difference Nb, the control unit 21 judges whether the torque increase control in the steps S4 and S5 of the lock-up control program PRO1 should be continued based on a torque increase control releasing judgement program PRO3 shown in FIG. 17.

In step S30 of the program PRO3 a judgement is made whether the torque increasing command, based on the steps S4 and S5 of the lock-up control program PRO1 is currently being output. If the torque increasing command is being output, in step S31, the control unit 21 calculates engine torque, i.e., the torque which is requested by the driver by depression of the accelerator pedal. The control unit 21 judges whether the calculated requested torque is greater than the actual engine output torque which was increased by the torque increasing command in steps S4 and S5 of the lock-up control program PRO1. If the requested torque is greater than the actual engine output torque which was increased by the torque increasing command in steps S4 and S5 of the lock-up control program PRO1, even if the engine torque is increased as requested by the driver, the engine speed is increased and the difference between the engine speed Ne and the input shaft speed Ni is reduced. Therefore, because it is unnecessary to execute control based on the steps S4 and S5 of the lock-up control program PRO1, the routine proceeds to step S32, and the torque increase control based on the steps S4 and S5 of the lock-up control program PRO1 is released. Accordingly, since the driver's operation of the accelerator pedal is reflected by the engine state, it is possible to continue driving without an unpleasant sensation.

Figure 12:
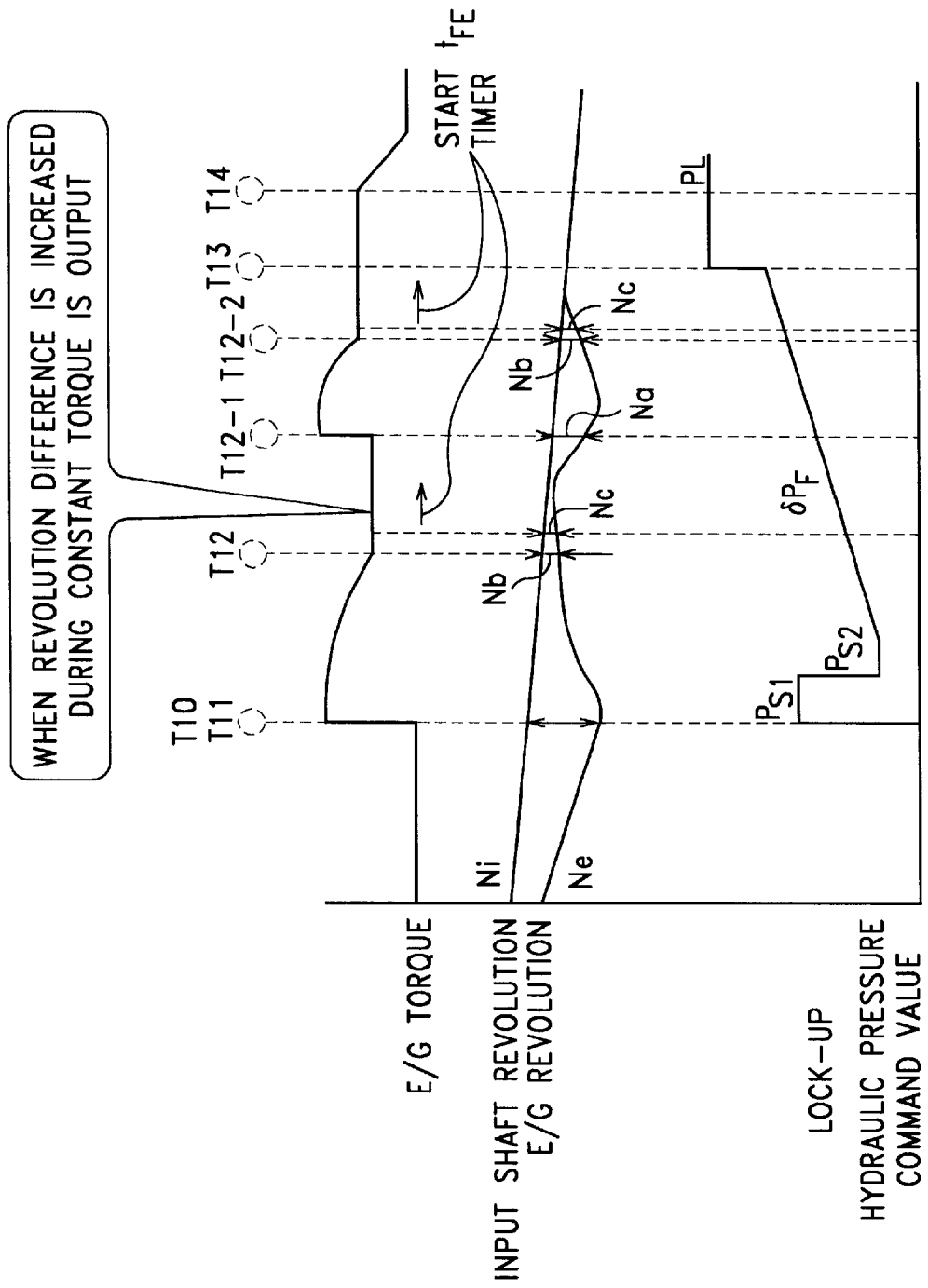
FIG. 12 is a time chart showing a control mode when the speed difference is increased during constant control of output torque of the engine.

In FIG. 9, during the period from time T12 to time T13, the control is the torque constant value output control of step S6 in the lock-up control program PRO1. During this control, if the speed difference increases again for some reason as shown in FIG. 12, the control unit 21 again commands the engine control system 31 to increase the torque at time T12-1 at which the speed difference became lower than the threshold value Na of the torque increase starting control. The torque increase control is continued until a time T12-2 at which the speed difference (Ni) exceeds the predetermined value, and the speed difference is reduced.

At time T12-2 at which the difference Ne−Ni exceeds the predetermined value Nb, the constant torque control is again started so that the operation of engaging the lock-up clutch 4a can be carried out smoothly without generating shift shock.

In the above-described embodiment, although the difference between the input shaft speed Ni and the engine speed Ne is obtained as a speed value, alternatively, the difference may be obtained as a speed ratio.

According to this invention, if the difference between the engine speed and the input shaft speed exceeds a predetermined range, upon engagement of the lock-up clutch 4a, it is only necessary to execute the lock-up control program PRO1 so that the difference between the engine revolution Ne and the input shaft speed Ni becomes smaller, and therefore it is not always necessary to increase the engine speed. Further, the speed of the input shaft of the transmission mechanism may be lowered by appropriate means such as a brake to reduce the difference between the engine speed Ne and the speed Ni of the input shaft of the transmission mechanism.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The teachings of Japanese Application No. 2000-121463, filed Apr. 21, 2000 are incorporated herein in their entirety, inclusive of the specification, claims and drawings.

What is claimed is:

1. A lock-up control apparatus for an automatic transmission having a torque converter between an engine and a transmission mechanism, in which the torque converter includes a lock-up clutch for directly coupling an output shaft of the engine and an input shaft of the transmission mechanism, said lock-up control apparatus comprising:

an engine speed sensor for detecting speed of the engine output shaft;

an input shaft speed sensor for detecting speed of the input shaft;

lock-up clutch control means for determining that engagement of the lock-up clutch should be initiated when the detected speed of the engine shaft is lower than the detected speed of the input shaft and, when a determination is made that engagement of the lock-up clutch should be initiated, determining a difference between the engine shaft speed detected by said engine speed sensor and the input shaft speed detected by said input shaft speed sensor, and comparing the determined difference with a predetermined range;

lock-up clutch driving means for engaging the lock-up clutch by hydraulic pressure responsive to signals from said lock-up clutch control means; and engine speed control means for increasing the engine speed to bring the difference between the engine shaft speed and the input shaft speed to within the predetermined range prior to completion of engagement of the lock-up clutch by the lock-up clutch driving means, responsive to determination of a speed difference which exceeds the predetermined range.

2. A lock-up control apparatus according to claim 1, wherein the engine speed control means increases output torque of the engine as the detected speed difference becomes greater.

3. A lock-up control apparatus according to claim 2, wherein when the engine speed and the input shaft speed are the same, the engine speed control means reduces the engine output torque as the input shaft speed becomes greater.

4. A lock-up control apparatus according to claim 2, wherein when the engine speed and the input shaft speed converge within a predetermined range, the engine speed control means maintains the output torque constant for a predetermined time.

5. A lock-up control apparatus according to claim 2, wherein when the engine speed and the input shaft speed converge within the predetermined range and if the output torque of the engine is positive, the engine speed control means maintains the output torque at 0.

6. A lock-up control apparatus according to claim 4, wherein when the engine speed and the input shaft speed of the transmission mechanism converge within the predetermined range and the output torque of the engine is negative, the engine speed control means maintains the output torque constant at the level obtained when the engine and input shaft speeds converged within the predetermined range.

7. A lock-up control apparatus according to claim 1, wherein the lock-up clutch driving means sweeps up engaging hydraulic pressure at a predetermined gradient to execute an operation for engaging the clutch, and the sweep-up is continued for a predetermined time after the engine speed converges within the predetermined range and then the engagement of the lock-up clutch is maintained by holding a constant hydraulic pressure.

8. A lock-up control apparatus according to claim 1, wherein the lock-up clutch driving means sweeps up engagement hydraulic pressure at a predetermined gradient to execute an operation for engaging the clutch, and at an instant when the engine speed and the input shaft speed converge within the predetermined range, the lock-up clutch driving means immediately holds the engagement by application of a holding hydraulic pressure.

9. A lock-up control apparatus according to claim 4, wherein said engine speed control means maintains the output torque constant for a predetermined time after the operation of engaging the lock-up clutch by said lock-up clutch driving means has been completed.

10. A lock-up control apparatus according to claim 9, wherein said engine speed control means, after lapse of said predetermined time, sweeps down the output torque at a predetermined point in time.

11. A lock-up control apparatus according to claim 2, wherein when the output torque is increased, the output torque is limited within a range of a predetermined threshold value.

12. A lock-up control apparatus according to claim 1, wherein the speed difference is a difference in rotational speed.

13. A lock-up control apparatus according to claim 1, wherein the speed difference is a ratio of the engine speed and the input shaft speed.

14. A lock-up control apparatus according to claim 1, wherein in shifting from a first gear stage wherein the lock-up clutch is engaged to a second gear stage wherein the lock-up clutch is engaged, the lock-up clutch driving means temporarily releases the lock-up clutch, and
upon re-engagement of the lock-up clutch with completion of the shift to the second gear shift stage, the engine speed control means controls the engine speed so that the difference between the engine speed and the input shaft speed of the transmission mechanism converge within the predetermined range.

15. A lock-up control apparatus according to claim 1, wherein in shifting from a first gear stage wherein the lock-up clutch is not engaged to a second gear shift stage wherein the lock-up clutch is engaged, the engine speed control means controls the engine speed so that the difference between the engine speed and the speed of the input shaft of the transmission mechanism converges within the predetermined range.

16. A lock-up control apparatus according to claim 1, wherein at the same gear stage, when the state of the lock-up clutch is shifted from disengaged to engaged, the engine speed control means controls the engine speed so that the difference between the engine speed and the input shaft speed converges within the predetermined range.

17. A lock-up control apparatus according to claim 14, further comprising fuel cut control means for discontinuing a fuel cut control in the first gear stage in which the lock-up clutch is engaged, when the lock-up clutch is temporarily released by the lock-up clutch driving means.

18. A lock-up control apparatus according to claim 1, wherein the operation of engaging the lock-up clutch by the lock-up clutch driving means is carried out simultaneously with the control of the engine speed by the engine speed control means.

19. A lock-up control apparatus according to claim 2, further comprising request torque calculating means for calculating engine torque requested by a driver by operation of an accelerator, and engine control releasing means for releasing the control of the engine by the engine control means when the engine torque calculated by the request torque calculating means exceeds output torque of the engine under control of the engine control means.

20. A lock-up control apparatus in an automatic transmission having a torque converter between an engine and a transmission mechanism, in which the torque converter includes a lock-up clutch for directly coupling an output shaft of the engine with an input shaft of the transmission mechanism, said lock-up control apparatus comprising:
an engine speed sensor for detecting speed of the engine output shaft;
an input shaft speed sensor for detecting speed of the input shaft;
lock-up clutch control means for determining that engagement of the lock-up clutch should be initiated when the detected speed of the engine shaft is lower than the detected speed of the input shaft and, when a determination is made that engagement of the lock-up clutch should be initiated, determining a difference between the engine shaft speed detected by said engine speed sensor and the input shaft speed detected by said input shaft speed sensor;
lock-up clutch driving means for engaging the lock-up clutch by hydraulic pressure responsive to signals from said lock-up clutch control means; and
speed difference control means for reducing the speed difference responsive to detection of a speed difference in excess of a predetermined range prior to completion of engagement of the lock-up clutch by the lock-up clutch driving means.

21. A lock-up control apparatus according to claim 20 further comprising a throttle opening sensor and wherein said lock-up clutch control means determines that engagement of lock-up clutch should be initiated based on the detected vehicle speed and a throttle opening detected by the throttle opening sensor, applied to a lock-up operation map stored in memory.

22. A lock-up control apparatus according to claim 1 further comprising a throttle opening sensor and wherein said lock-up clutch control means determines that engagement of lock-up clutch should be initiated based on the detected vehicle speed and a throttle opening detected by the throttle opening sensor, applied to a lock-up operation map stored in memory.

* * * * *